United States Patent
Zhao et al.

(10) Patent No.: US 11,134,269 B2
(45) Date of Patent: Sep. 28, 2021

(54) IMAGE ENCODING METHOD AND APPARATUS AND IMAGE DECODING METHOD AND APPARATUS

(71) Applicant: HUAWEI TECHNOLOGIES CO., LTD., Guangdong (CN)

(72) Inventors: Yin Zhao, Hangzhou (CN); Peiyun Di, Shenzhen (CN); Lu Yu, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/453,863

(22) Filed: Jun. 26, 2019

(65) Prior Publication Data

US 2019/0320198 A1  Oct. 17, 2019

Related U.S. Application Data

(63) Continuation of application No. PCT/CN2017/117990, filed on Dec. 22, 2017.

(30) Foreign Application Priority Data

Dec. 27, 2016  (CN) .......................... 201611228200.8

(51) Int. Cl.
*H04N 19/573* (2014.01)
*H04N 19/577* (2014.01)
*H04N 19/70* (2014.01)

(52) U.S. Cl.
CPC ......... *H04N 19/577* (2014.11); *H04N 19/573* (2014.11); *H04N 19/70* (2014.11)

(58) Field of Classification Search
CPC .. H04N 19/159; H04N 19/5731; H04N 19/46; H04N 19/70; H04N 19/39;
(Continued)

(56) References Cited

U.S. PATENT DOCUMENTS

2003/0007555 A1* 1/2003 Divakaran ............ G06F 16/785
                                                  375/240.01
2004/0258156 A1* 12/2004 Chujoh ................ H04N 19/134
                                                  375/240.16
(Continued)

FOREIGN PATENT DOCUMENTS

CN        1367613 A    9/2002
CN      101389034 A    3/2009
(Continued)

OTHER PUBLICATIONS

D-K Kwon et al: "Description of scalable video coding technology proposal by Texas Instruments", No. JCTVC-K0038, Oct. 2012, total 44 pages. XP03011297A.
(Continued)

*Primary Examiner* — Dave Czekaj
*Assistant Examiner* — Berteau Joisil
(74) *Attorney, Agent, or Firm* — Womble Bond Dickinson (US) LLP

(57) ABSTRACT

This disclosure provides an image encoding method and apparatus and an image decoding method and apparatus. For a to-be-encoded image in a to-be-encoded video sequence, a reference image may be selected from at least one knowledge-base image in a knowledge-base image set. In addition, bitstream data of the to-be-encoded image includes identification information used to identify the reference image of the to-be-encoded image.

12 Claims, 10 Drawing Sheets

(58) Field of Classification Search
CPC .. H04N 19/146; H04N 19/577; H04N 19/105; H04N 19/58; H04N 19/172
See application file for complete search history.

(56) References Cited

U.S. PATENT DOCUMENTS

| | | | |
|---|---|---|---|
| 2006/0188020 A1* | 8/2006 | Wang | H04N 19/40 375/240.16 |
| 2009/0316787 A1 | 12/2009 | Yamaguchi et al. | |
| 2012/0027271 A1* | 2/2012 | Zankowski | G06T 7/11 382/128 |
| 2014/0301473 A1 | 10/2014 | Park et al. | |
| 2015/0085939 A1 | 3/2015 | Deshpande | |
| 2017/0032504 A1* | 2/2017 | Lai | H04N 5/2353 |
| 2017/0105005 A1* | 4/2017 | Chen | H04N 19/159 |
| 2018/0014012 A1 | 1/2018 | Yu et al. | |
| 2018/0131948 A1* | 5/2018 | Wu | H04N 19/61 |

FOREIGN PATENT DOCUMENTS

| | | |
|---|---|---|
| CN | 103079072 A | 5/2013 |
| CN | 103140855 A | 6/2013 |
| CN | 103379320 A | 10/2013 |
| CN | 103957341 A | 7/2014 |
| CN | 104081779 A | 10/2014 |
| CN | 104768011 A | 7/2015 |
| CN | 104902279 A | 9/2015 |
| CN | 105981387 A | 9/2016 |
| EP | 3360325 A1 | 8/2018 |
| JP | 2010268283 A | 11/2010 |

OTHER PUBLICATIONS

Rusert T et al: "High level syntax for scalability support in HEVC", No. JCTVC-F491,Jul. 1, 2011, total 10 pages. XP030009514.
Siwei Dong et al. Performance Evaluation for AVS2 Scene Video Coding Techniques, 2015 IEEE International Conference on Multimedia Big Data, Jul. 2015. pp. 411-414. XP055324442.
ITU-T H.264(Oct. 2016), Series H: Audiovisual and Multimedia Systems Infrastructure of audiovisual services—Coding of moving video, Advanced video coding for generic audiovisual services, Oct. 2016. total 804 pages.
ITU-T H.265(Apr. 2015), Series H: Audiovisual and Multimedia Systems Infrastructure of audiovisual services—Coding of moving video, High efficiency video coding, Apr. 2015. total 634 pages.

* cited by examiner

IMAGE ENCODING METHOD AND APPARATUS AND IMAGE DECODING METHOD AND APPARATUS

CROSS-REFERENCE TO RELATED APPLICATIONS

This application is a continuation of International Application No. PCT/CN2017/117990, filed on Dec. 22, 2017, which claims priority to Chinese Patent Application No. 201611228200.8, filed on Dec. 27, 2016. The disclosures of the aforementioned applications are hereby incorporated by reference in their entireties.

TECHNICAL FIELD

This disclosure relates to the field of encoding and decoding technologies, and more specifically, to an image encoding method and apparatus and an image decoding method and apparatus.

BACKGROUND

During existing video sequence processing, to enable an encoded video sequence to support a random access function, the video sequence is segmented into a plurality of segments having the random access function (which are referred to as random access segments for short). As shown in FIG. 1, one video sequence includes at least one random access segment, and each random access segment includes one random access image and a plurality of non-random access images. An image in a random access segment may be intra-frame encoded, or may be encoded through inter prediction with reference to another image in the random access segment. The encoding performed through inter prediction is referred to as inter-frame encoding for short.

However, in the prior art, an image in a random access segment can only be used as a reference image of another image in the random access segment, to be specific, inter prediction (Inter prediction) across random access points is not allowed. This mechanism in the prior art limits efficiency of image encoding and image decoding.

SUMMARY

This disclosure provides an image encoding method and apparatus and an image decoding method and apparatus, to improve efficiency of image encoding and image decoding, and find a unique corresponding image based on identification information of a reference image of a to-be-decoded image in bitstream data, thereby improving a correctness percentage of image decoding. Technical solutions are as follows:

One embodiment provides an image encoding method. The method includes:

obtaining a to-be-encoded image in a to-be-encoded video sequence and at least one knowledge-base image in a knowledge-base image set; selecting a reference image of the to-be-encoded image from the at least one knowledge-base image, where an image in the knowledge-base image set is used as a candidate reference image of an image in the to-be-encoded video sequence; and performing inter-frame encoding on the to-be-encoded image based on the reference image to obtain bitstream data of the to-be-encoded image, where the bitstream data of the to-be-encoded image includes encoded data of the to-be-encoded image and identification information used to identify the reference image. It can be learned from the foregoing that, for the to-be-encoded image in the to-be-encoded video sequence, the reference image may be selected from the at least one knowledge-base image in the knowledge-base image set. Compared with that a reference image of a to-be-encoded image can only be selected from a random access segment in which the to-be-encoded image is located, a quantity of reference images that can be referred to for the to-be-encoded image is increased, to be specific, a range of candidate reference images of the to-be-encoded image is extended to some extent, to help improve efficiency of image encoding to some extent. In addition, the bitstream data of the to-be-encoded image includes the identification information used to identify the reference image of the to-be-encoded image. In this way, even if the reference image is encoded as an all-intra-mode-encoding-based or inter-frame-encoding-based random access image, a decoder side can find, based on the identification information of the reference image, a reconstructed image of a unique reference image corresponding to the identification information after receiving the bitstream data, thereby implementing correct image decoding.

Before the obtaining a to-be-encoded image in a to-be-encoded video sequence and at least one knowledge-base image in a knowledge-base image set, the method may further include: selecting a knowledge-base image from the to-be-encoded video sequence as a part or all of images in the knowledge-base image set.

The knowledge-base image set may be a subset of the to-be-encoded video sequence, or may have an intersection set with the to-be-encoded video sequence (where the knowledge-base image set has an image not belonging to the to-be-encoded video sequence), or may have no intersection set with the to-be-encoded video sequence (where for example, the knowledge-base image set is obtained through modeling of the image in the to-be-encoded video sequence).

The identification information used to identify the reference image includes a sequence number of the reference image in the knowledge-base image set.

In one embodiment, the to-be-encoded image is any one of the first image, the second image, and the third image in a decoding order in a random access segment in which the to-be-encoded image is located.

In one embodiment, at least one image in the at least one knowledge-base image does not belong to the random access segment in which the to-be-encoded image is located, so that the image not belonging to the random access segment in which the to-be-encoded image is located can also be selected as the reference image, thereby extending the range of candidate reference images of the to-be-encoded image.

In one embodiment, an image in the knowledge-base image set may be at least one of a background image in the to-be-encoded video sequence, a scene switching image in the to-be-encoded video sequence, an image obtained through modeling of the image in the to-be-encoded video sequence, and an image obtained through composition of the image in the to-be-encoded video sequence.

In one embodiment, the knowledge-base image may be at least one of a background image in the to-be-encoded video sequence, a scene switching image in the to-be-encoded video sequence, an image obtained through modeling of the image in the to-be-encoded video sequence, and an image obtained through composition of the image in the to-be-encoded video sequence.

In one embodiment, the image set including the knowledge-base image and an image set including the to-beencoded video sequence are two image sets independent of each other, but the knowledge-base image set includes an image selected from the to-be-encoded video sequence.

In one embodiment, the image in the knowledge-base image set is only used as a candidate reference image of an image in the to-be-encoded video sequence, to distinguish the image in the knowledge-base image set from the image in the to-be-encoded video sequence.

In one embodiment, the selecting a reference image of the to-be-encoded image from the at least one knowledge-base image includes: selecting reference images of the to-be-encoded image from at least two knowledge-base images, to select a plurality of reference images for the to-be-encoded image.

In one embodiment, different images in the knowledge-base image set have different identification information, to find a unique corresponding image based on the identification information.

In one embodiment, the identification information of the reference image includes sequence number information of the reference image in the knowledge-base image set.

In one embodiment, the to-be-encoded video sequence includes at least two sequence segments, the identification information of the reference image includes identification information of a reference sequence segment in which the to-be-encoded image is located, and one reference sequence segment may correspond to one knowledge-base image set. In addition, when different reference images in the knowledge-base image set have same sequence number information in the knowledge-base image set, the reference images can still be distinguished based on the identification information of the reference sequence segment in which the to-be-encoded image is located. The identification information of the reference sequence segment is used to indicate that the reference image is used as a candidate reference image of an image in the reference sequence segment. The reference sequence segment includes a random access segment in which the to-be-encoded image is located, and the reference sequence segment is any one of the at least two sequence segments.

In one embodiment, the performing inter-frame encoding on the to-be-encoded image based on the reference image includes: obtaining a reconstructed image of the reference image based on the reference image; and performing inter-frame encoding on the to-be-encoded image based on the reconstructed image of the reference image. Correspondingly, the identification information of the reference image includes quality layer information of the reference image, and the quality layer information of the reference image is used to indicate at least one of a resolution of the reconstructed image of the reference image and a bitstream bit rate of the reconstructed image of the reference image. In this way, when a same knowledge-base image has reconstructed images on a plurality of quality layers, a reconstructed image to be referred to may be specified. Bitstream data that is of the to-be-encoded video sequence and that is on a plurality of quality layers may share knowledge-base bitstream data of one quality layer. In this way, when the decoder side switches between bitstream data of different quality layers due to network bandwidth fluctuation, if these quality layers correspond to knowledge-base bitstream data of a same quality layer, the decoder side can reduce a download volume of the knowledge-base bitstream data, to improve transmission efficiency. The knowledge-base bitstream data includes bitstream data of the image in the knowledge-base image set.

In one embodiment, the performing inter-frame encoding on the to-be-encoded image based on the reference image may further include: when the reconstructed image of the reference image already exists, obtaining the reconstructed image of the reference image. The reconstructed image already exists because the reference image has been used as a reference image of another image in the to-be-encoded video sequence before.

According to one embodiment, the method further includes: sending bitstream data of the reference image to a decoder side, where the bitstream data of the reference image does not belong to bitstream data of the to-be-encoded video sequence, the bitstream data of the reference image includes encoded data of the reference image and an image type of the reference image, and the image type of the reference image is used to indicate that the reference image is an image in the knowledge-base image set. The decoder side is a decoder, a terminal, or a computer device performing the image decoding method.

The bitstream data of the to-be-encoded video sequence and the bitstream data of knowledge-base image set (or the bitstream data of the reference image) may be two independent bitstreams. To be specific, even if the reference image is an image in the to-be-encoded video sequence, during bitstream data generation, the reference image is used as an image in the to-be-encoded video sequence for bitstream data generation, and is also used as a knowledge-base image for bitstream data generation. Encoding schemes of the two pieces of bitstream data may be different. When the reference image is used as an image in the to-be-encoded video sequence, the reference image is encoded in an existing manner. When the reference image is used as a knowledge-base image, all intra mode encoding is performed, or another knowledge base image is used as a reference image for encoding.

In one embodiment, the bitstream data of the reference image further includes the identification information of the reference image.

In one embodiment, the bitstream data of the reference image is carried in a network abstraction layer unit corresponding to the reference image.

In one embodiment, the image type of the reference image and the identification information of the reference image are carried in a network abstraction layer unit header of a network abstraction layer unit corresponding to the reference image; or the image type of the reference image is carried in a network abstraction layer unit header of a network abstraction layer unit corresponding to the reference image, and the identification information of the reference image is carried in a network abstraction layer slice header of the network abstraction layer unit corresponding to the reference image.

In one embodiment, the bitstream data of the to-be-encoded image further includes an image type of the to-be-encoded image, and the image type of the to-be-encoded image is used to indicate that the encoded data of the to-be-encoded image is obtained through inter-frame encoding based on an image in the knowledge-base image set.

In one embodiment, the bitstream data of the to-be-encoded image is sent to the decoder side. The bitstream data of the to-be-encoded image belongs to the bitstream data of the to-be-encoded video sequence.

In one embodiment, the bitstream data of the to-be-encoded image is carried in a network abstraction layer unit corresponding to the to-be-encoded image.

In one embodiment, the image type of the to-be-encoded image is further used to indicate a quantity of reference images.

In one embodiment, the image type of the to-be-encoded image and the identification information of the reference image are carried in a network abstraction layer unit header of the network abstraction layer unit corresponding to the to-be-encoded image; or the image type of the to-be-encoded image is carried in a network abstraction layer unit header of the network abstraction layer unit corresponding to the to-be-encoded image, and the identification information of the reference image is carried in a network abstraction layer slice header of the network abstraction layer unit corresponding to the to-be-encoded image.

One embodiment provides an image encoding apparatus. The apparatus includes: an obtaining unit, configured to obtain a to-be-encoded image in a to-be-encoded video sequence and at least one knowledge-base image in a knowledge-base image set; a selection unit, configured to select a reference image of the to-be-encoded image from the at least one knowledge-base image, where an image in the knowledge-base image set is used as a candidate reference image of an image in the to-be-encoded video sequence; and an encoding unit, configured to perform inter-frame encoding on the to-be-encoded image based on the reference image to obtain bitstream data of the to-be-encoded image, where the bitstream data of the to-be-encoded image includes encoded data of the to-be-encoded image and identification information used to identify the reference image. It can be learned from the foregoing that for the to-be-encoded image in the to-be-encoded video sequence, the reference image may be selected from the at least one knowledge-base image in the knowledge-base image set. Compared with that a reference image of a to-be-encoded image can only be selected from a random access segment in which the to-be-encoded image is located, a quantity of reference images that can be referred to for the to-be-encoded image is increased, to be specific, a range of candidate reference images of the to-be-encoded image is extended to some extent, to help improve efficiency of image encoding to some extent. In addition, the bitstream data of the to-be-encoded image includes the identification information used to identify the reference image of the to-be-encoded image. In this way, even if the reference image is encoded as an all-intra-mode-coding-based random access image, a decoder side can find, based on the identification information of the reference image, a reconstructed image of a unique reference image corresponding to the identification information after receiving the bitstream data, thereby implementing correct image decoding.

One embodiment provides an image decoding method. The method includes: obtaining bitstream data of a to-be-decoded image, where the bitstream data of the to-be-decoded image includes encoded data of the to-be-decoded image and identification information used to identify a reference image of the to-be-decoded image; searching, based on the identification information of the reference image, a reconstructed-image set for a reconstructed image having the identification information of the reference image, where the reconstructed image is a knowledge-base reconstructed image obtained through reconstruction, the knowledge-base reconstructed image is a reconstructed image of an image in a knowledge-base image set, and the image in the knowledge-base image set is used as a candidate reference image of an image in a to-be-decoded video sequence in which the to-be-decoded image is located; and when the reconstructed image having the identification information of the reference image is found, performing inter-frame decoding on the encoded data of the to-be-decoded image based on the reconstructed image having the identification information of the reference image, to obtain a reconstructed image of the to-be-decoded image. It can be learned based on the foregoing that the reference image used for decoding the to-be-decoded image may be obtained from the reconstructed-image set outside a random access segment, to increase a quantity of reference images that can be referred to for the to-be-decoded image, to be specific, to extend a range of candidate reference images of the to-be-decoded image to some extent, to help improve efficiency of image decoding to some extent. In addition, a decoder side can find, based on the identification information of the reference image, a reconstructed image of a unique reference image corresponding to the identification information, thereby implementing correct image decoding.

The knowledge-base reconstructed image exists because the knowledge-base reconstructed image has been used for inter-frame decoding of another image in the to-be-decoded video sequence and therefore has been reconstructed.

In one embodiment, the method further includes: when the reconstructed image having the identification information of the reference image is not found, obtaining, based on the identification information of the reference image, bitstream data having the identification information of the reference image as bitstream data of the reference image, where the bitstream data of the reference image does not belong to bitstream data of the to-be-decoded video sequence, so that the bitstream data having the identification information of the reference image is excluded from the bitstream data of the to-be-decoded video sequence, and the bitstream data of the reference image includes encoded data of the reference image and the identification information of the reference image; performing decoding based on the encoded data of the reference image to obtain a reconstructed image of the reference image, where the reconstructed image of the reference image has the identification information of the reference image; and performing inter-frame decoding on the encoded data of the to-be-decoded image based on the reconstructed image of the reference image to obtain a reconstructed image of the to-be-decoded image, so that when the reconstructed image having the identification information of the reference image is not found, the decoder side can still obtain the reconstructed image of the reference image by decoding the encoded data in the bitstream data of the reference image, thereby implementing decoding of the to-be-decoded image.

In one embodiment, the to-be-decoded image is any one of the first image, the second image, and the third image in a decoding order in a random access segment in which the to-be-decoded image is located.

In one embodiment, the image in the knowledge-base image set is only used as the candidate reference image of the image in the to-be-decoded video sequence in which the to-be-decoded image is located, to distinguish the image in the knowledge-base image set from the image in the to-be-decoded video sequence.

In one embodiment, the method further includes: updating the reconstructed-image set by using the reconstructed image of the reference image as a new reconstructed image in the reconstructed-image set, to increase a quantity of reconstructed images in the reconstructed-image set. In this way, when another to-be-decoded image in the to-be-decoded video sequence is decoded, a possibility of a matched reconstructed image can be improved, thereby improving the efficiency of the image decoding.

In one embodiment, the bitstream data of the reference image includes an image type of the reference image, and the image type of the reference image is used to indicate that the reference image is an image in the knowledge-base image set.

In one embodiment, the image type of the reference image and the identification information of the reference image are carried in a network abstraction layer unit header of a network abstraction layer unit corresponding to the reference image; or the image type of the reference image is carried in a network abstraction layer unit header of a network abstraction layer unit corresponding to the reference image, and the identification information of the reference image is carried in a network abstraction layer slice header of the network abstraction layer unit corresponding to the reference image.

In one embodiment, the bitstream data of the reference image is carried in the network abstraction layer unit corresponding to the reference image.

In one embodiment, different reconstructed images in the reconstructed-image set have different identification information, to distinguish between the reconstructed images.

In one embodiment, the to-be-decoded video sequence includes at least two sequence segments, the identification information of the reference image includes identification information of a reference sequence segment in which the to-be-decoded image is located, the identification information of the reference sequence segment is used to indicate that the reference image is used as a candidate reference image of an image in the reference sequence segment, the reference sequence segment includes a random access segment in which the to-be-encoded image is located, and the reference sequence segment is any one of the at least two sequence segments, so that when sequence number information of reference images in the knowledge-base image sets corresponding to the sequence segments is the same, the reference image can be distinguished based on the identification information of the reference sequence segment in which the to-be-decoded image is located.

In one embodiment, the method further includes: when a playing order of the to-be-decoded video sequence is sequential playing, deleting a reconstructed image having identification information of a previous sequence segment from the reconstructed-image set to update the reconstructed-image set, to save storage space. The previous sequence segment is a sequence segment previous to the reference sequence segment in the playing order.

In one embodiment, the identification information of the reference image includes quality layer information of the reference image, and the quality layer information of the reference image is used to indicate at least one of a resolution of the reconstructed image of the reference image and a bitstream bit rate of the reconstructed image of the reference image, so that a reconstructed image matched with quality layer information of the to-be-decoded image is obtained from the reconstructed-image set based on the quality layer information of the reference image, thereby implementing correct decoding of the to-be-decoded image.

In one embodiment, the bitstream data of the to-be-decoded image further includes an image type of the to-be-decoded image, and the image type of the to-be-decoded image is used to indicate that the encoded data of the to-be-decoded image is obtained through inter-frame encoding based on an image in the knowledge-base image set.

In one embodiment, the image type of the to-be-decoded image is further used to indicate a quantity of reference images, when the image type of the to-be-decoded image indicates that the quantity of reference images is at least two, there are at least two pieces of identification information of the reference images, and the reference images are in a one-to-one correspondence with the identification information of the reference images, so that when decoding is performed with reference to reconstructed images of the at least two reference images, the reconstructed image having the identification information of the reference image can still be found.

In one embodiment, the image type of the to-be-decoded image and identification information of the to-be-decoded image are carried in a network abstraction layer unit header of a network abstraction layer unit corresponding to the to-be-decoded image; or the image type of the to-be-decoded image is carried in a network abstraction layer unit header of a network abstraction layer unit corresponding to the to-be-decoded image, and identification information of the to-be-decoded image is carried in a network abstraction layer slice header of the network abstraction layer unit corresponding to the to-be-decoded image.

One embodiment provides an image decoding apparatus. The apparatus includes: an obtaining unit, configured to obtain bitstream data of a to-be-decoded image, where the bitstream data of the to-be-decoded image includes encoded data of the to-be-decoded image and identification information used to identify a reference image of the to-be-decoded image; a search unit, configured to search, based on the identification information of the reference image, a reconstructed-image set for a reconstructed image having the identification information of the reference image, where the reconstructed image is a knowledge-base reconstructed image obtained through reconstruction, the knowledge-base reconstructed image is a reconstructed image of an image in a knowledge-base image set, and the image in the knowledge-base image set is used as a candidate reference image of an image in a to-be-decoded video sequence in which the to-be-decoded image is located; and a decoding unit, configured to: when the reconstructed image having the identification information of the reference image is found, perform inter-frame decoding on the encoded data of the to-be-decoded image based on the reconstructed image having the identification information of the reference image, to obtain a reconstructed image of the to-be-decoded image. It can be learned based on the foregoing that the reference image used for decoding the to-be-decoded image may be obtained from the reconstructed-image set outside a random access segment, to increase a quantity of reference images that can be referred to for the to-be-decoded image, to be specific, to extend a range of candidate reference images of the to-be-decoded image to some extent, to help improve efficiency of image decoding to some extent. In addition, the image decoding apparatus can find, based on the identification information of the reference image, a reconstructed image of a unique reference image corresponding to the identification information, thereby implementing correct image decoding.

One embodiment provides an image encoding apparatus. The image encoding apparatus includes: a memory, a processor, and a transmitter. The processor is configured to perform the image encoding method according to any one of the first aspect and all the foregoing possible embodiments.

One embodiment provides a storage medium. The storage medium records program code configured to perform the image encoding method according to any one of the first aspect and all the foregoing possible embodiments.

One embodiment provides an image decoding apparatus. The image decoding apparatus includes: a memory, a processor, and a receiver. The processor is configured to perform the image decoding method according to any one of the third aspect and all the foregoing possible embodiments.

One embodiment provides a storage medium. The storage medium records program code configured to perform the image decoding method according to any one of the third aspect and all the foregoing possible embodiments.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following descriptions show merely the embodiments of this disclosure, and a person of ordinary skill in the art may derive other drawings from these accompanying drawings without creative efforts.

DESCRIPTION OF EMBODIMENTS

Figure 1:
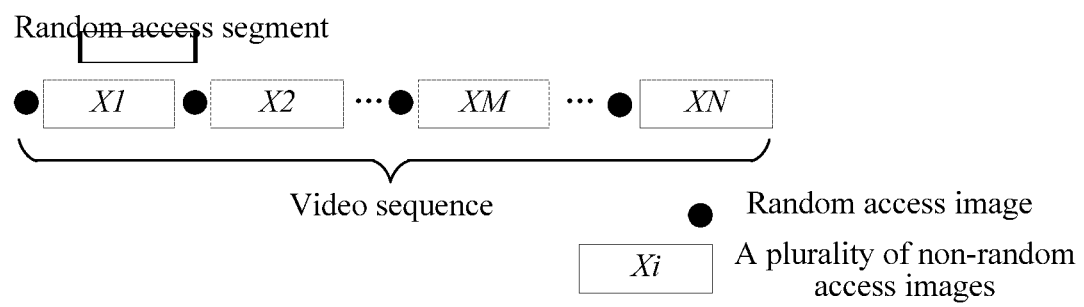
FIG. 1 is a schematic diagram of a random access segment according to an embodiment of this disclosure.

When any image in a random access segment shown in FIG. 1 is encoded, an image can only be selected from the random access segment to be used as a reference image. Consequently, an image that can be used as the reference image of the image in the random access segment is limited, and efficiency of image encoding is reduced to some extent. In view of this, the image that can be used as the reference image of the image in the random access segment is modified in the embodiments of the present disclosure. For example, an image not located in the random access segment may be referred to for the first image, the second image, and the third image in a decoding order in the random access segment shown in FIG. 1. How the image not located in the random access segment is referred to as a reference image for the three images is described below with reference to FIG. 2, and an encoding process and a decoding process that are performed based on the reference image are described.

Figure 2:
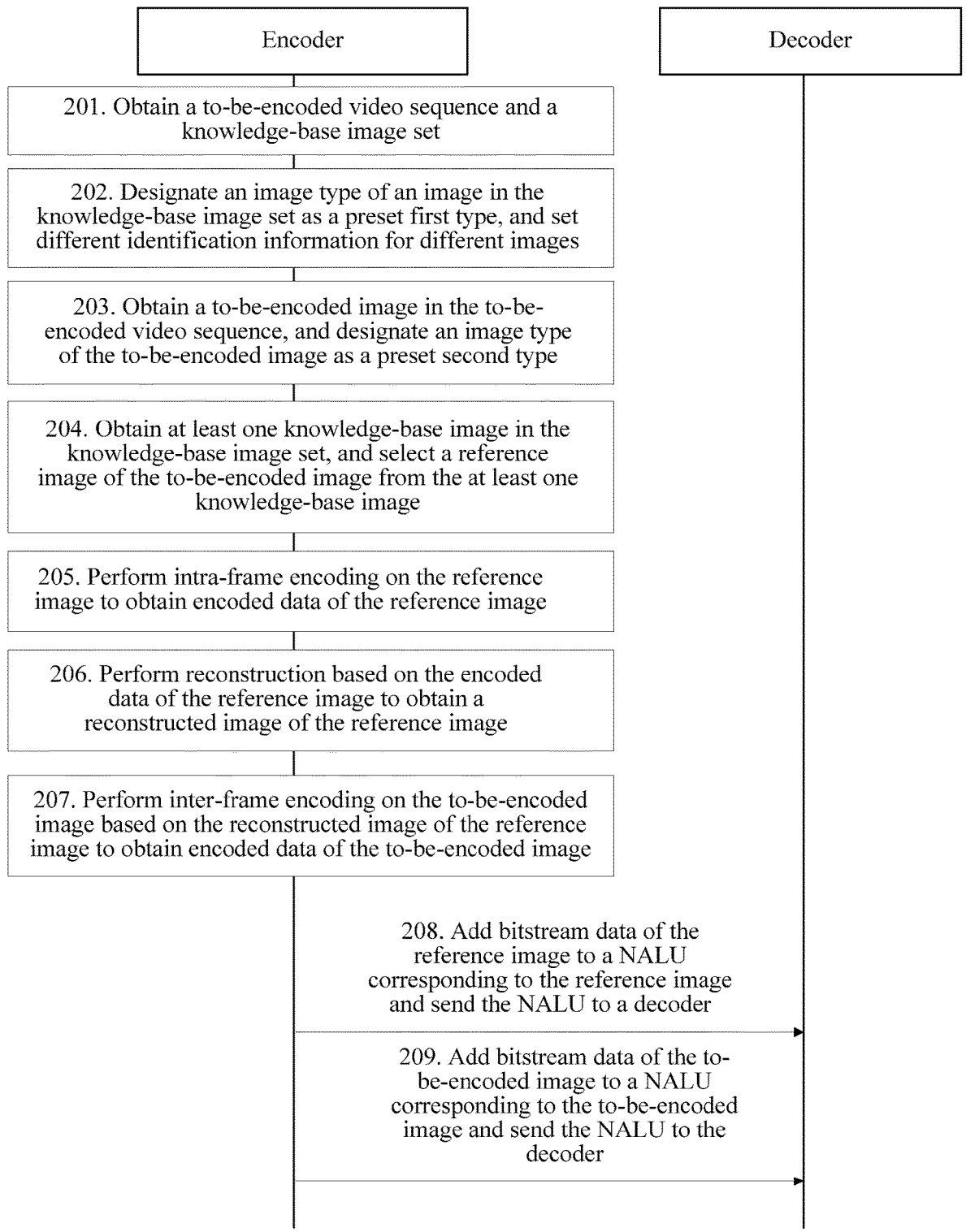
FIG. 2 is a flowchart of an image encoding method according to an embodiment of this disclosure.

FIG. 2 is a flowchart of an image encoding method according to an embodiment of this disclosure. The method may be performed by an encoder, a server, or a computer device. An example in which the encoder performs the image encoding method is used in FIG. 2 for description. The following actions, operations, blocks, etc., may be included.

201: Obtain a to-be-encoded video sequence and a knowledge-base image set, where the to-be-encoded video sequence is a received video sequence to be encoded, and the video sequence is an image sequence of a complete video or an image sequence of a plurality of complete videos.

The knowledge-base image set is an image set including at least one image, and the image in the knowledge-base image set may be used as a candidate reference image of an image in the to-be-encoded video sequence. In this way, a reference image may be selected from the image in the knowledge-base image set for the first image, the second image, and the third image in a decoding order in a random access segment. In this embodiment of the present disclosure, a form of the image in the knowledge-base image set includes, but is not limited to, the following manner: selecting the image in the knowledge-base image set from another video sequence.

The image in the knowledge-base image set may be at least one of a background image in the to-be-encoded video sequence, a scene switching image in the to-be-encoded video sequence, an image obtained through modeling of the image in the to-be-encoded video sequence, and an image obtained through composition of the image in the to-be-encoded video sequence. The background image may be obtained through background modeling of the to-be-encoded video sequence. The scene switching image is obtained through scene switching detection on the to-be-encoded video sequence.

There are a plurality of methods for performing scene switching detection on the to-be-encoded video sequence. For example, a pixel value difference average of a plurality of groups of pixels in two neighboring images in the to-be-encoded video sequence is calculated. When the pixel value difference average is greater than a threshold, it is considered that scene switching has been performed in the two images. For another example, image features are extracted from two images in the to-be-encoded video sequence (for example, through SIFT). When a matching degree between the image features is less than a threshold, it is considered that scene switching has been performed in the two images.

The image in the knowledge-base image set is an image extracted from the to-be-encoded video sequence. An extraction manner is as follows: obtaining a plurality of similar-image groups in the to-be-encoded video sequence, and extracting at least one image from each similar-image group. Each extracted image is stored in the knowledge-base image set to be used as a candidate reference image of an image in the to-be-encoded video sequence. Each similar-image group includes at least two images that appear in the to-be-encoded video sequence for a plurality of times and between which an image similarity falls within a preset similarity range.

It should be noted herein that, the image in the knowledge-base image set may only be used as the candidate reference image of the image in the to-be-encoded video sequence, to distinguish the image in the knowledge-base image set from the image in the to-be-encoded video sequence. For the knowledge-base image, the image set including the knowledge-base image and an image set including the to-be-encoded video sequence are two image sets independent of each other. However, the image in the knowledge-base image set may be extracted from the to-be-encoded video sequence or may be obtained through modeling or composition of the image in the to-be-encoded video sequence.

202: Designate an image type of an image in the knowledge-base image set as a preset first type, to indicate, by using the preset first type, that the image is an image in the knowledge-base image set, and different identification information may also be set for different images in the knowledge-base image set, so that a unique corresponding image in the knowledge-base image set may be found for the image in the knowledge-base image set based on the identification information.

In this embodiment of the present disclosure, identification information of the image in the knowledge-base image set includes sequence number information of the image in the knowledge-base image set. For different images, sequence number information of the images in the knowledge-base image set is different. For example, in the knowledge-base image set, the images are numbered starting from 0 in an image obtaining order, so that the images in the knowledge-base image set have different sequence numbers.

203: Obtain a to-be-encoded image in the to-be-encoded video sequence, and designate an image type of the to-be-encoded image as a preset second type, where the to-be-encoded image is the first image, the second image, or the third image in a decoding order in a random access segment in which the to-be-encoded image is located.

In an H.265 standard, an image type of each image may be indicated by using nal_unit_type. In this embodiment of this disclosure, the preset first type and the preset second type are used as nal_unit_type of the image in the knowledge-base image set and nal_unit_type of the to-be-encoded image. For example, the preset first type is named as IDR_LB, and the preset second type is named as IDR_L.

In addition, in the H.265 standard, nal_unit_type of number 22 to number 31, namely, RSV_IRAP_VCL22, RSV_IRAP_VCL23, RSV_VCL24, . . . , and RSV_VCL31, is reserved for extension. Therefore, in this embodiment of this disclosure, reserved nal_unit_type may be used as a value of the preset first type and a value of the preset second type. For example, the following two manners may be used but are not limited thereto:

Manner one: RSV_IRAP_VCL22 is used to indicate that the image is an image in the knowledge-base image set, to be specific, the value of the preset first type IDR_LB is RSV_IRAP_VCL22. RSV_IRAP_VCL23 is used to indicate that encoded data of the to-be-encoded image is obtained through inter-frame encoding based on an image in the knowledge-base image set, to be specific, the value of the preset second type IDR_L is RSV_IRAP_VCL23.

Manner two: RSV_IRAP_VCL22 is used to indicate that the image is an image in the knowledge-base image set, to be specific, the value of the preset first type IDR_LB is RSV_IRAP_VCL22. RSV_VCL24 is used to indicate that encoded data of the to-be-encoded image is obtained through inter-frame encoding based on an image in the knowledge-base image set, to be specific, the value of the preset second type IDR_L is RSV_VCL24.

204: Obtain at least one knowledge-base image in the knowledge-base image set, and select a reference image of the to-be-encoded image from the at least one knowledge-base image.

The at least one knowledge-base image may be the background image in the to-be-encoded video sequence and the scene switching image in the to-be-encoded video sequence. Certainly, the obtained knowledge-base image may be alternatively an image obtained through modeling of the image in the to-be-encoded video sequence and an image obtained through composition of the image in the to-be-encoded video sequence.

For an image in the at least one knowledge-base image, at least one image does not belong to the random access segment in which the to-be-encoded image is located. To be specific, at least one image not belonging to the random access segment in which the to-be-encoded image is located may be used as a candidate reference image of the to-be-encoded image, so that the image not belonging to the random access segment in which the to-be-encoded image is located may also be selected as the reference image of the to-be-encoded image. A manner of selecting the reference image from the at least one knowledge-base image may be selecting an image having a highest image similarity with the to-be-encoded image as the reference image of the to-be-encoded image.

205: Perform intra-frame encoding on the reference image to obtain encoded data of the reference image.

206: Perform reconstruction based on the encoded data of the reference image to obtain a reconstructed image of the reference image, where identification information of the reference image is used as identification information of the reconstructed image of the reference image, so that reconstructed images of different reference images have different identification information.

207: Perform inter-frame encoding on the to-be-encoded image based on the reconstructed image of the reference image to obtain encoded data of the to-be-encoded image.

208: Add bitstream data of the reference image to a NALU (Network Abstraction Layer Unit, network abstraction layer unit) corresponding to the reference image and send the NALU to a decoder side, where the decoder side may be a decoder, a terminal, or a computer device that can perform the image decoding method, and the decoder is used as an example in FIG. 2 for description.

The bitstream data of the reference image does not belong to bitstream data of the to-be-encoded video sequence, to be specific, the bitstream data of the reference image and the bitstream data of the to-be-encoded video sequence are independent of each other. The bitstream data of the reference image includes the encoded data of the reference image, an image type of the reference image, and the identification information of the reference image. The image type of the reference image and the identification information of the reference image are carried in a NAL unit header (network abstraction layer unit header) of the NALU corresponding to the reference image.

When the at least one knowledge-base image is selected from the to-be-encoded video sequence, the reference image of the to-be-encoded image that is selected from the at least one knowledge-base image is an image in the to-be-encoded video sequence, in other words, an image in the to-be-encoded video sequence is the reference image of the to-be-encoded image. For this type of image in the to-be-encoded video sequence, this type of image has two pieces of bitstream data. One piece of bitstream data is used as bitstream data of the image in the to-be-encoded video sequence, and the other piece of bitstream data is used as the bitstream data of the reference image. When the at least one knowledge-base image is not selected from the to-be-encoded video sequence, the reference image of the to-beencoded image that is selected from the at least one knowledge-base image is not an image in the to-be-encoded video sequence. Therefore, the bitstream data of the reference image does not belong to the bitstream data of the to-be-encoded video sequence. In addition, for each image in the to-be-encoded video sequence, the image has only one piece of bitstream data, and the bitstream data belongs to the bitstream data of the to-be-encoded video sequence.

209: Add bitstream data of the to-be-encoded image to a NALU corresponding to the to-be-encoded image and send the NALU to the decoder side, where the bitstream data of the to-be-encoded image includes the encoded data of the to-be-encoded image, the identification information used to identify the reference image, and the image type of the to-be-encoded image, and the image type of the to-be-encoded image and the identification information of the reference image are carried in a NAL unit header of the NALU corresponding to the to-be-encoded image.

In this embodiment of this disclosure, the identification information of the reference image is sequence number information of the reference image in the knowledge-base image set. Therefore, a syntactic example of a NAL unit header carrying the image type corresponding to the foregoing image and the sequence number information of the reference image in the knowledge-base image set is shown in Table 1:

TABLE 1

Syntactic example of a NAL unit header carrying an image type and sequence number information

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| if(nal_unit_type == IDR_LB \|\| | |
| nal_unit_type == IDR_L) | |
| lb_idx | u(16) |
| } | |

It can be learned from Table 1 that, when nal_unit_type is IDR_LB, it indicates that the NAL unit header corresponds to the image in the knowledge-base image set and the NALU carries bitstream data of the image, for example, the reference image, in the knowledge-base image set. When nal_unit_type is IDR_L, it indicates that the NAL unit header corresponds to the to-be-encoded image in the to-be-encoded video sequence and the NALU carries the bitstream data of the to-be-encoded image.

In addition, a syntactic element after nal_unit_type in the NAL unit header is parsed to obtain a sequence number lb_idx, and the sequence number is the identification information of the reference image. lb_idx may be an integer-bit fixed-length code, for example, a 16-bit fixed-length code or an 8-bit fixed-length code, as shown in an italic part in Table 1.

The 16-bit fixed-length code or the 8-bit fixed-length code is selected because a number of bits of an original NAL unit header is 16 (where numbers of bits occupied by original four syntactic elements are 1+6+6+3=16), to be specific, a total number of bits is an integer multiple of 8. To ensure that a number of bits of a changed NAL unit header is still an integer multiple of 8, the 16-bit fixed-length code or the 8-bit fixed-length code is selected for lb_idx. In addition, it can be learned from Table 1 that a sequence number of one reference image is encapsulated in Table 1, and it indicates that one reference image is selected for the to-be-encoded image. Therefore, in this embodiment of this disclosure, the to-be-encoded image may be encoded or decoded based on a reconstructed image of the selected reference image.

Certainly, different quantities of reference images may be selected for to-be-encoded images. For example, one reference image is selected for at least one of all the to-be-encoded images, and a plurality of reference images are selected for the other of all the to-be-encoded images. In this embodiment of this disclosure, an example in which two reference images are selected for the other to-be-encoded image is used for description. An image type of a to-be-encoded image for which one reference image is referred to is designated as a preset third type, and an image type of a to-be-encoded image for which two reference images are referred to is designated as a preset fourth type, to indicate a quantity of reference images by using the image type.

For example, the preset third type is named as IDR_L_UNI, and the preset fourth type is named as IDR_L_BI. Corresponding, syntactic examples of NAL unit headers carrying the two image types are both shown in Table 2:

TABLE 2

Syntactic example of a NAL unit header carrying an image type and sequence number information

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| if(nal_unit_type == IDR_LB \|\| nal_unit_type == IDR_L_UNI \|\| nal_unit_type == IDR_L_BI) | |
| lb_idx | u(16) |
| if(nal_unit_type == IDR_L_BI) | |
| lb_idx2 | u(16) |
| } | |

When nal_unit_type is IDR_L UNI, it indicates that the NAL unit header corresponds to the to-be-encoded image in the to-be-encoded video sequence, and one reference image is selected for the to-be-encoded image. A syntactic element after nal_unit_type in the NAL unit header is parsed to obtain a sequence number lb_idx. The sequence number is identification information of the reference image selected for the to-be-encoded image. When nal_unit_type is IDR_L_BI, it indicates that the NAL unit header corresponds to the to-be-encoded image in the to-be-encoded video sequence, and two reference images are selected for the to-be-encoded image. A syntactic element after nal_unit_type in the NAL unit header is parsed to obtain two sequence numbers lb_idx and lb_idx2. The two sequence numbers are respectively identification information corresponding to the two selected reference images. When nal_unit_type is IDR_LB, it indicates that the NAL unit header corresponds to the reference image. A syntactic element after nal_unit_type in the NAL unit header is parsed to obtain a sequence number lb_idx. The sequence number is the identification information of the reference image.

In this embodiment of this disclosure, the image type and the identification information of the reference image may be alternatively carried in another manner. For example, the image type of the reference image is carried in the NAL unit header of the NALU corresponding to the reference image, and the identification information of the reference image is carried in a network abstraction layer slice header (slice header, or referred to as a slice segment header) of the NALU corresponding to the reference image. The image type of the to-be-encoded image is carried in the NAL unit header of the NALU corresponding to the to-be-encoded image, and the identification information of the reference image selected for the to-be-encoded image is carried in a slice header of the NALU corresponding to the to-be-encoded image.

In this embodiment of this disclosure, nal_unit_type in a syntactic example of an existing NAL unit header in the H.265 standard is used to indicate an image type of an image, as shown in Table 3.

TABLE 3

Syntactic example of a NAL unit header in an H.265 standard

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

A syntactic example of a slice header that is of the NALU and that carries the sequence number information of the reference image in the knowledge-base image set is shown in Table 4:

TABLE 4

Syntactic example of a slice header carrying sequence number information

| slice_segment_header( ) { | Descriptor |
|---|---|
| first_slice_segment_in_pic_flag | u(1) |
| if( nal_unit_type  >=  BLA_W_LP  && nal_unit_type  <= RSV_IRAP_VCL23 ) | |
| no_output_of_prior_pics_flag | u(1) |
| if(nal_unit_type == IDR_LB  ‖  nal_unit_type == IDR_L) | |
| lb_idx | *u(16)* |
| slice_pic_parameter_set_id | ue(v) |
| ... //A remaining syntactic element is omitted } | |

When nal_unit_type in the NAL unit header is IDR_LB, it indicates that the NALU corresponds to the reference image, and a sequence number lb_idx obtained by parsing a syntactic element in the slice header is the identification information of the reference image. When nal_unit_type in the NAL unit header is IDR_L, it indicates that the NALU corresponds to the to-be-encoded image, and a sequence number lb_idx obtained by parsing a syntactic element in the slice header is identification information of a reference image selected for the to-be-encoded image. In addition, the identification information lb_idx of the reference image is an integer-bit specific-length code, for example, a 16-bit specified-length code or an 8-bit specified length code, as shown in an italic part in Table 3. Alternatively, an Exp-Golomb code (unsigned Exponential-Golomb code, unsigned Exponential-Golomb code) may be used.

If different quantities of reference images are selected for to-be-encoded images, as described above, one reference image is selected for at least one of all the to-be-encoded images, and two reference images are selected for the other of all the to-be-encoded images, a syntactic example of a slice header carrying the sequence number information of the reference image in the knowledge-base image set is shown in Table 5:

TABLE 5

Syntactic example of a slice header carrying sequence number information

| slice_segment_header( ) { | Descriptor |
|---|---|
| first_slice_segment_in_pic_flag | u(1) |
| if( nal_unit_type  >=  BLA_W_LP  && nal_unit_type  <= RSV_IRAP_VCL23 ) | |
| no_output_of_prior_pics_flag | u(1) |
| if(nal_unit_type == IDR_LB  ‖  nal_unit_type == IDR_L_UNI ‖ nal_unit_type == IDR_L_BI) | |
| lb_idx | *u(16)* |
| if(nal_unit_type == IDR_L_BI) | |
| lb_idx2 | *u(16)* |
| slice_pic_parameter_set_id | ue(v) |
| ... //A remaining syntactic element is omitted } | |

It can be learned from the foregoing technical solution that, for the to-be-encoded image in the to-be-encoded video sequence, the reference image may be selected from the at least one knowledge-base image in the knowledge-base image set. Compared with that a reference image of a to-be-encoded image can only be selected from a random access segment in which the to-be-encoded image is located, a quantity of reference images that can be referred to for the to-be-encoded image is increased, to be specific, a range of candidate reference images of the to-be-encoded image is extended to some extent, to help improve efficiency of image encoding to some extent. In addition, the bitstream data of the to-be-encoded image includes the identification information used to identify the reference image of the to-be-encoded image. In this way, even if the reference image is encoded as an all-intra (All Intra)-mode-coding-based or inter-frame-coding-based random access image, the decoder side can find, based on the identification information of the reference image, a reconstructed image of a unique reference image corresponding to the identification information after receiving the bitstream data, thereby implementing correct image decoding.

Figure 3:
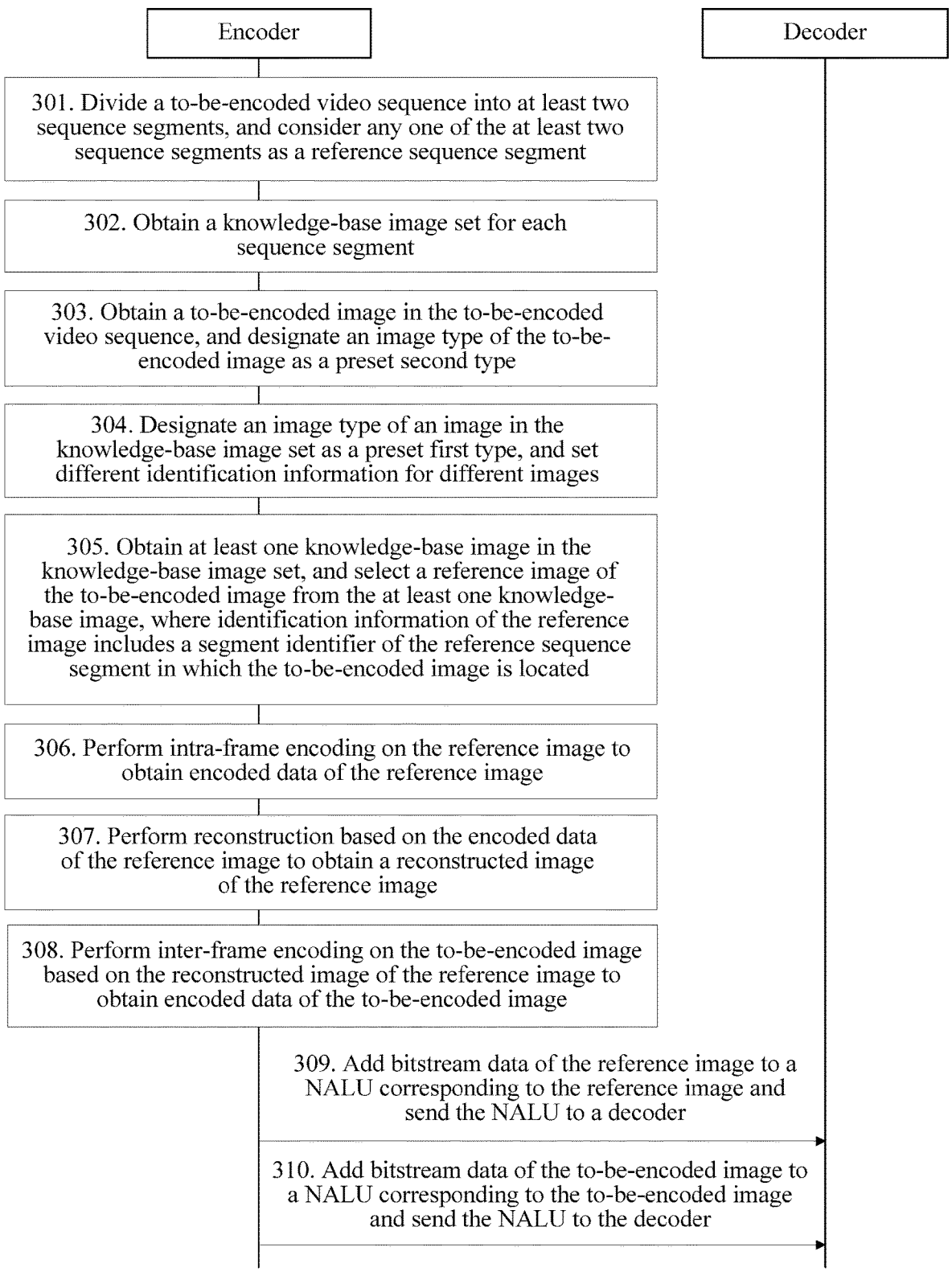
FIG. 3 is another flowchart of an image encoding method according to an embodiment of this disclosure.

FIG. 3 is another flowchart of an image encoding method according to an embodiment of this disclosure. The image encoding method shown in FIG. 3 is obtained based on FIG. 2 through modification, and a difference from the image encoding method shown in FIG. 2 is as follows:

Block 301: Divide the to-be-encoded video sequence into at least two sequence segments, and allocate corresponding identification information, for example, a corresponding sequence-segment sequence number, to each sequence segment, where for example, a 120-minute film is segmented into 60 sequence segments having a length of approximately 2 minutes, each sequence segment of approximately 2 minutes corresponds to a unique sequence-segment sequence number, and the sequence-segment sequence number may be used as identification information of the sequence segment.

Block 302: Construct a knowledge-base image set for each sequence segment, where during encoding of a to-be-encoded image in a sequence segment, at least one knowledge-base image should be obtained from a knowledge-base image set corresponding to the sequence segment in which the to-be-encoded image is located, and a reference image of the to-be-encoded image is selected from the obtained at least one knowledge-base image; in this manner, construction of the knowledge-base image set and encoding of the to-be-encoded image for each sequence segment of the to-be-encoded video sequence are allowed to be performed concurrently, to improve an image encoding speed.

In addition, different images in any knowledge-base image set have different identification information. However, different images in different knowledge-base image sets may have same identification information. For example, identification information of an image is sequence number information of the image in the knowledge-base image set, sequence number information of images in different knowledge-base image sets starts from 0, and after bitstream data of these images is summarized, a plurality of images correspond to same sequence number information, resulting in decoding disorder. Therefore, to resolve the problem and correctly distinguish between images in each knowledge-base image set, in this embodiment of this disclosure, any one of the at least two sequence segments is considered as a reference sequence segment, and the identification information of the reference image includes identification information of a reference sequence segment in which the to-be-encoded image is located, as described in block 305, to indicate that the reference image may be used as a candidate reference image of an image in the reference sequence segment. The reference sequence segment in which the to-be-encoded image is located includes a random access segment in which the to-be-encoded image is located.

To be specific, in this embodiment of this disclosure, the identification information of the reference image includes the sequence number information of the reference image in the knowledge-base image set and the identification information of the reference sequence segment in which the to-be-encoded image is located. Therefore, a syntactic example of a NAL unit header carrying this type of identification information is shown in Table 6:

TABLE 6

Syntactic example of a NAL unit header carrying sequence number information and identification information of a reference sequence segment

| nal_unit_header( ) { | Descriptor |
|---|---|
|   forbidden_zero_bit | f(1) |
|   nal_unit_type | u(6) |
|   nuh_layer_id | u(6) |
|   nuh_temporal_id_plus1 | u(3) |
|   if(nal_unit_type == IDR_LB  \|\|   nal_unit_type == IDR_L) { | |
|     vid_idx | u(10) |
|     frame_idx | u(8) |
|   } | |
| } | | vid_idx is the identification information of the reference sequence segment in which the to-be-encoded image is located, frame_idx is the sequence number information, a total length of vid_idx and frame_idx is X bits, vid_idx has a length of X1 bits and occupies X1 high-order bits in the X bits, and frame_idx occupies X-X1 low-order bits in the X bits. X1 may be X/2, 6, 7, or 10.

In addition, in an application scenario of sequential playing, each image in a knowledge-base image set corresponding to a sequence segment that has been encoded is not used any more. Therefore, some images used as candidate reference images may be deleted, to save storage space. The deleted image that is used as a candidate reference image is an image having identification information of a previous sequence segment, and the previous sequence segment is a sequence segment previous to, in a playing order, a reference sequence segment in which a current to-be-encoded image is located.

Figure 4:
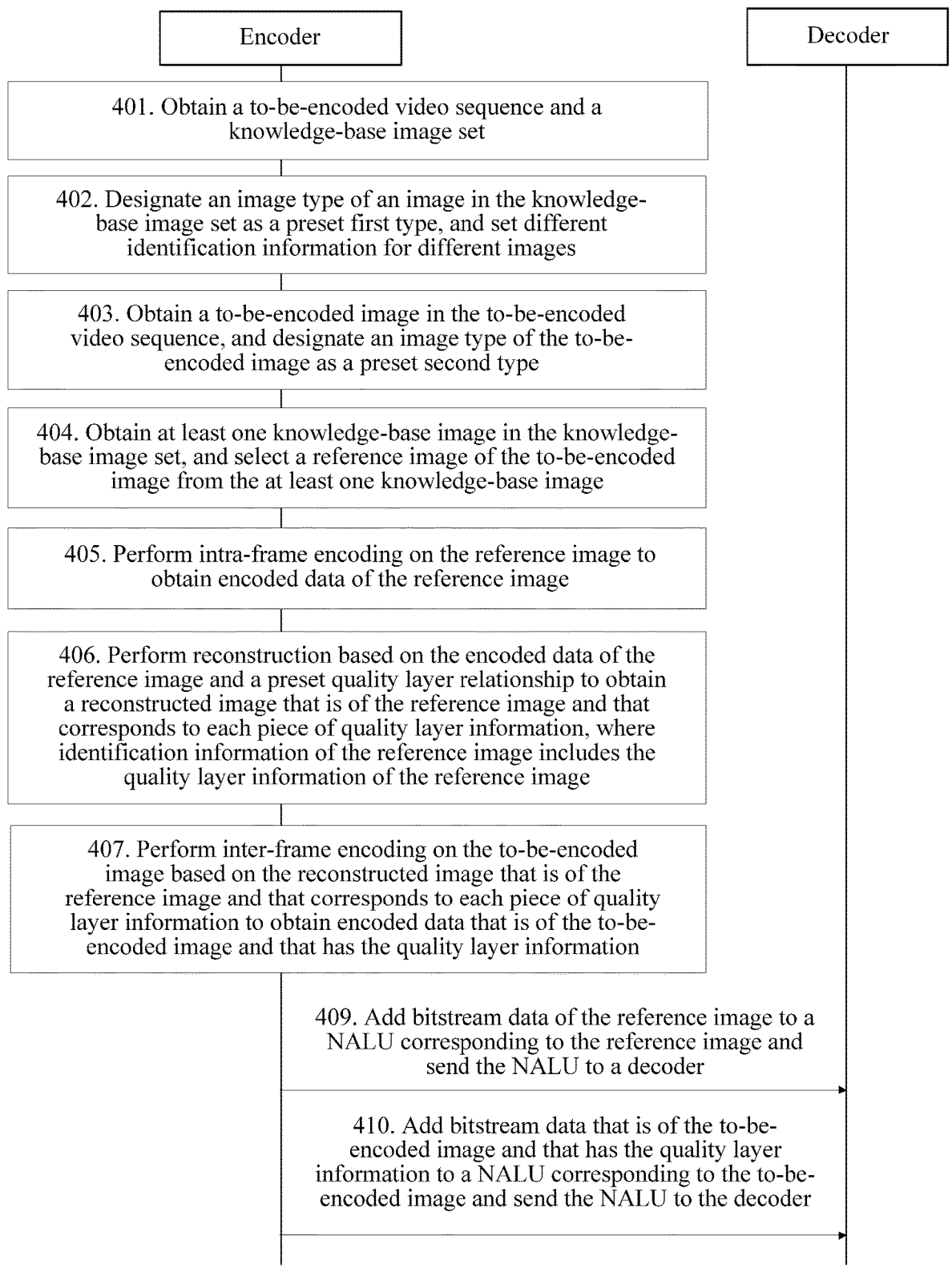
FIG. 4 is still another flowchart of an image encoding method according to an embodiment of this disclosure.

FIG. 4 is still another flowchart of an image encoding method according to an embodiment of this disclosure. The image encoding method shown in FIG. 4 is obtained based on FIG. 2 through modification, and a difference from the image encoding method shown in FIG. 2 is as follows:

A to-be-encoded video sequence is encoded for a plurality of times, to obtain bitstream data of the to-be-encoded video sequence on different quality layers. Each piece of bitstream data of the to-be-encoded video sequence (referred to as video bitstream data for short) corresponds to one quality layer. For example, a to-be-encoded video sequence having an original resolution of 1920×1080 is encoded for a plurality of times, to obtain video bitstream data on three quality layers, namely, 1920×1080@4 Mbps (where to be specific, an image resolution is 1920×1080 and a bitstream bit rate is 4 Mbps (Million bits per second, megabit per second)), 1920×1080@2.5 Mbps, and 1280×720@1 Mbps. Correspondingly, knowledge-base bitstream data of the knowledge-base image set on different quality layers is obtained based on a preset quality layer relationship, to be specific, a pre-allocated correspondence between video bitstream data and a knowledge-base bitstream data of the knowledge-base image set, as described in block 406 and block 407.

For example, the preset quality layer relationship is as follows: the video bitstream data on the quality layer of 1920×1080@4 Mbps and the video bitstream data on the quality layer of 1920×1080@2.5 Mbps share knowledge-base bitstream data whose quality layer is a resolution of 1920×1080, and the video bitstream data on the quality layer of 1280×720@1 Mbps separately uses knowledge-base bitstream data whose quality layer is a resolution of 1280×720, that is, the video bitstream data on the three quality layers corresponds to knowledge-base bitstream data on two quality layers. Each image in the knowledge-base image set is encoded twice based on the correspondence, to obtain reconstructed images that are of the image in the knowledge-base image set and whose corresponding quality layers are resolutions of 1920×1080 and 1280×720, to obtain knowledge-base bitstream data on the corresponding quality layers.

For another example, the preset quality layer relationship is as follows: the video bitstream data on the quality layer of 1920×1080@4 Mb and the video bitstream data on the quality layer of 1920×1080@2.5 Mbps share knowledge-base bitstream data whose quality layer is a bitstream rate of 1920×1080@2.5 Mbps, and the video bitstream data on the quality layer of 1280×720@1 Mbps separately uses knowledge-base bitstream data whose quality layer is a bitstream rate of 1280×720@1 Mbps. Based on the correspondence, an image sequence including the knowledge-base image set is encoded twice, to obtain knowledge-base bitstream data on the two quality layers, namely, 1920×1080@2.5 Mbps and 1280×720@1 Mbps. For a reconstructed image of an image in the knowledge-base image set, a quality layer corresponding to the reconstructed image is a bitstream rate of knowledge-base bitstream data corresponding to the reconstructed image.

A benefit that video bitstream data of a plurality of quality layers shares knowledge-base bitstream data of one quality layer is as follows: When the decoder side switches between bitstream data of different quality layers due to network bandwidth fluctuation, if these quality layers correspond to knowledge-base bitstream data of a same quality layer, the decoder side can reduce a download volume of the knowledge-base bitstream data, to improve transmission efficiency.

When a to-be-encoded video sequence of three quality layers is encoded, an image of a preset corresponding quality layer should be selected as a reference image of a to-be-encoded image. Therefore, identification information of the reference image includes quality layer information of the reference image. The quality layer information of the reference image is used to indicate at least one of a resolution of a reconstructed image of the reference image and a bitstream bit rate of the reconstructed image of the reference image. A manner in which a NAL unit header carries sequence number information and the quality layer information of the reference image is shown in Table 7:

TABLE 7

Syntactic example of a NAL unit header carrying sequence number information and quality layer information

| nal_unit_header( ) { | Descriptor |
|---|---|
|     forbidden_zero_bit | f(1) |
|     nal_unit_type | u(6) |
|     nuh_layer_id | u(6) |
|     nuh_temporal_id_plus1 | u(3) |
|     if(nal_unit_type == IDR_LB  \|\|  nal_unit_type == IDR_L) { | |
|         quality_idx | u(6) |
|         frame_idx | u(10) |
|     } | |
| } | | quality_idx is the quality layer information. In this embodiment of this disclosure, different quality layer information is set for different quality layers. For example, different quality layers may be indicated by using quality layer sequence numbers. frame_idx is the sequence number information of the reference image. A total length of quality_idx and frame_idx is Y bits, quality_idx has a length of Y1 bits and occupies Y1 high-order bits in the Y bits, and frame_idx occupies Y-Y1 low-order bits in the Y bits. Y1 may be 4, 5, 6, 7, or 8.

Certainly, in this embodiment of this disclosure, FIG. 3 and FIG. 4 may be combined, so that the image in the knowledge-base image set can support a multi-sequence segment and multi-quality-layer bitstream manner. To be specific, the identification information of the reference image includes three parts, namely, the identification information of the reference sequence segment in which the to-be-encoded image is located, the sequence number information of the reference image in the knowledge-base image set, and the quality layer information of the reference image:

(1) the identification information vid_idx of the reference sequence segment in which the to-be-encoded image is located, having a length of Z1 bits and occupying Z1 high-order bits;

(2) the quality layer information quality_idx of the reference image, having a length of Z2 bits and occupying Z2 middle-order bits; and (3) the sequence number information frame_idx of the reference image in the knowledge-base image set, having a length of X-Z1-Z2 bits and occupying X-Z1-Z2 low-order bits.

X, Z1, and Z2 are positive integers. For example, X=24, Z1=8, and Z2=8; or X=16, Z1=8, and Z2=4; or X=24, Z1=10, and Z2=6, as shown in a syntactic element organization in Table 8. 24-bit identification information including vid_idx, quality_idx, and frame_idx corresponds to a unique reference image.

TABLE 8

Syntactic example of a NAL unit header carrying identification information of a reference sequence segment, quality layer information, and sequence number information

| nal_unit_header( ) { | Descriptor |
|---|---|
|     forbidden_zero_bit | f(1) |
|     nal_unit_type | u(6) |
|     nuh_layer_id | u(6) |
|     nuh_temporal_id_plus1 | u(3) |
|     if(nal_unit_type == IDR_LB  \|\|  nal_unit_type == IDR_L) { | |
|         vid_idx | u(10) |
|         quality_idx | u(6) |
|         frame_idx | u(8) |
|     } | |
| } | |

It should be noted that, compositions of the identification information of the image in the knowledge-base image set may be arranged in any order, and only a preferred sequence is provided in Table 8. For example, the compositions may be arranged in an order of quality_idx, vid_idx, and frame_idx.

Figure 5A:
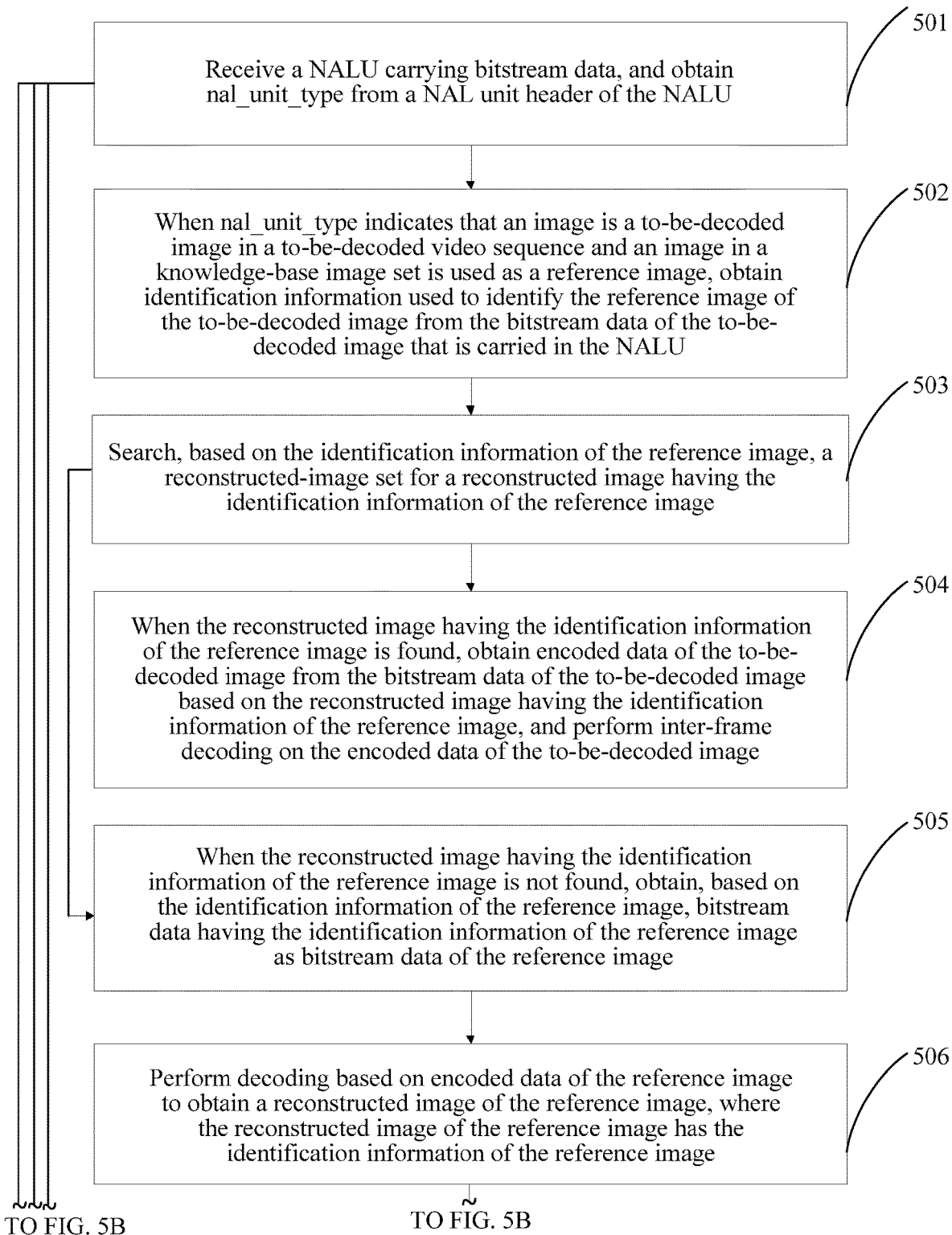
FIG. 5A and FIG. 5B are a flowchart of an image decoding method according to an embodiment of this disclosure.
Figure 5B:
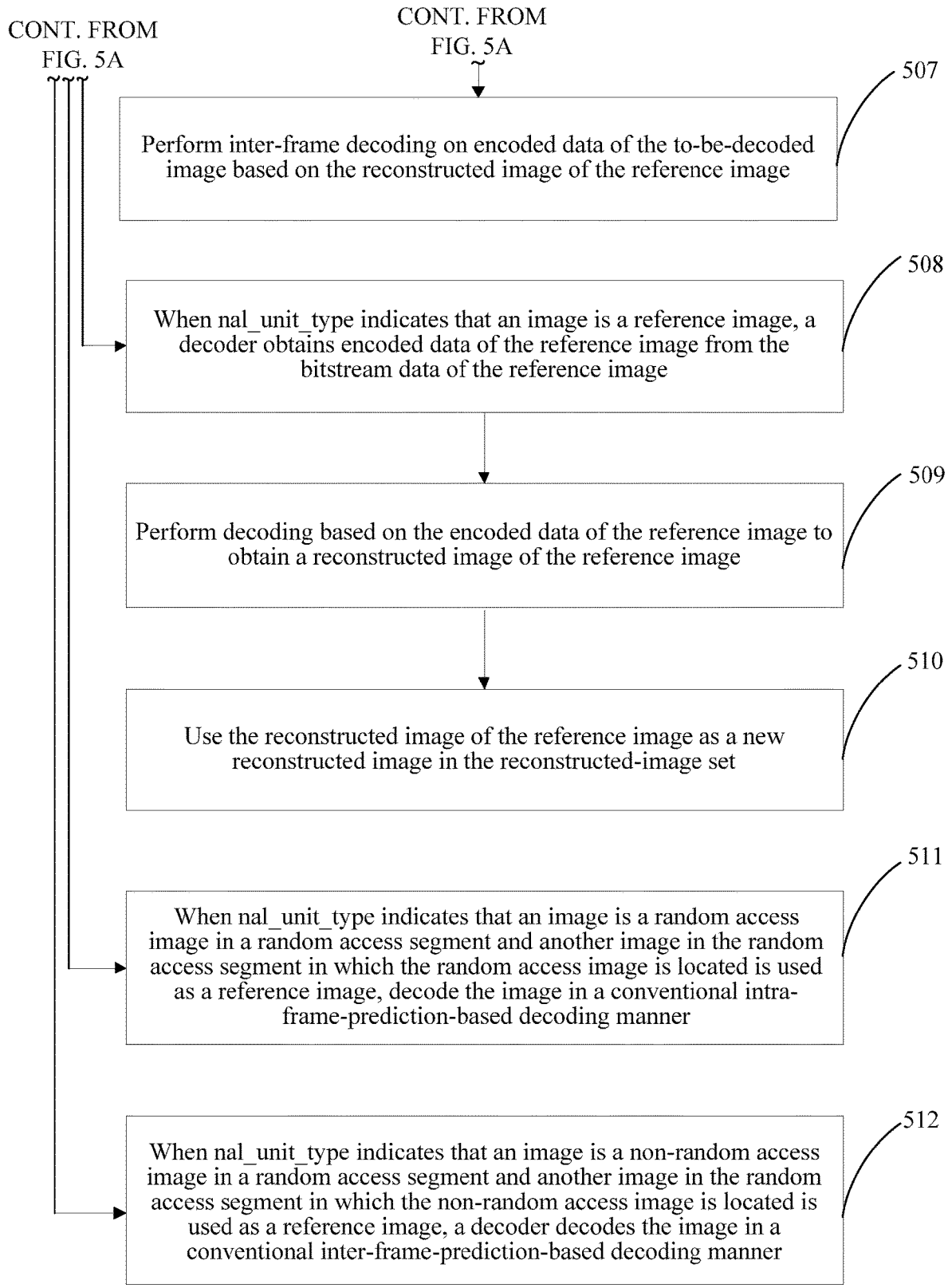

FIG. 5A and FIG. 5B show an image decoding method according to an embodiment of this disclosure. The method may be performed by a decoder, a terminal, or a computer device, and may include the following actions, operations, blocks, etc.

501: Receive a NALU carrying bitstream data, and obtain nal_unit_type from a NAL unit header of the NALU, where nal_unit_type indicates an image type of an image, to determine, based on nal_unit_type, an image to which the bitstream data belongs, to process the bitstream data in different manners.

When nal_unit_type indicates that the image is a to-be-decoded image in a to-be-decoded video sequence, the to-be-decoded image is any one of the first image, the second image, and the third image in a decoding order in a random access segment in which the to-be-decoded image is located, and an image in a knowledge-base image set is used as a reference image, it is determined that the bitstream data is bitstream data of the to-be-decoded image in the to-be-decoded video sequence, and block 502 to block 507 are performed. The to-be-decoded video sequence is a received video sequence to be decoded, and the video sequence is an image sequence of a complete video or an image sequence of a plurality of complete videos. When nal_unit_type indicates that the image is a reference image, it is determined that the bitstream data is bitstream data of the reference image, and block 508 to block 510 are performed. When nal_unit_type indicates that the image is a random access image in a random access segment shown in FIG. 1, and another image in the random access segment in which the random access image is located is used as a reference image of the random access image, it is determined that the bitstream data is bitstream data of the image that is in the random access segment and for which an image in the random access segment is referred to as the reference image, and block 511 is performed. When nal_unit_type indicates that the image is a non-random access image in a random access segment shown in FIG. 1, and another image in the random access segment in which the non-random access image is located is used as a reference image of the non-random access image, it is determined that the bitstream data is bitstream data of the image that is in the random access segment and for which an image in the random access segment is referred to as the reference image, and block 512 is performed.

502: When nal_unit_type indicates that the image is a to-be-decoded image in a to-be-decoded video sequence, the to-be-decoded image is any one of the first image, the second image, and the third image in a decoding order in a random access segment in which the to-be-decoded image is located, and an image in a knowledge-base image set is used as a reference image, obtain identification information used to identify the reference image of the to-be-decoded image from the bitstream data of the to-be-decoded image that is carried in the NALU.

When the identification information of the reference image is carried in a NAL unit header of the NALU corresponding to the to-be-decoded image, the identification information of the reference image is obtained from the NAL unit header. When the identification information of the reference image is carried in a slice header of the NALU corresponding to the to-be-decoded image, the identification information of the reference image is obtained from the slice header.

It should be noted herein that, for the to-be-decoded image, in addition to indicating that an image in the knowledge-base image set is used as the reference image of the to-be-decoded image, an image type of the to-be-decoded image is further used to indicate a quantity of reference images referred to for the to-be-decoded image. When the image type of the to-be-decoded image indicates that the quantity of reference images is at least two, there are at least two pieces of identification information of the reference images, and the reference images are in a one-to-one correspondence with the identification information of the reference images, to still find, during decoding performed with reference to reconstructed images of the at least two reference images, a reconstructed image having the identification information of the reference image.

503: Search, based on the identification information of the reference image, a reconstructed-image set for a reconstructed image having the identification information of the reference image, where the reconstructed image is a knowledge-base reconstructed image obtained through reconstruction, that is, the reconstructed-image set includes the knowledge-base reconstructed image obtained through reconstruction, the knowledge-base reconstructed image is a reconstructed image of an image in the knowledge-base image set, and the image in the knowledge-base image set is used as a candidate reference image of an image in the to-be-decoded video sequence in which the to-be-decoded image is located, so that a reference image may be selected from the image in the knowledge-base image set for the first image, the second image, and the third image in the decoding order in the random access segment in the to-be-decoded video sequence.

In this embodiment of this disclosure, different images in the knowledge-base image set have different identification information. Identification information of an image in the knowledge-base image set is allocated to a reconstructed image of the image, that is, identification information of a knowledge-base reconstructed image obtained through reconstruction is identification information of a corresponding image in the knowledge-base image set, so that different reconstructed images in the reconstructed-image set have different identification information, to distinguish between the reconstructed images. In this way, a unique reconstructed image corresponding to the identification information may be found based on the identification information of the reference image.

For example, the identification information of the reference image may include sequence number information of the reference image in the knowledge-base image set. Therefore, during search of the reconstructed image, the reconstructed image is searched for based on the sequence number information of the reference image in the knowledge-base image set. In addition, bitstream data of a plurality of to-be-decoded images may be obtained, and the bitstream data of the plurality of to-be-decoded images has different quality layer information. This means that during decoding of bitstream data of a to-be-decoded image that has quality layer information, a reconstructed image matched with the quality layer information should be found. Therefore, the identification information of the reference image includes quality layer information of the reference image. The quality layer information of the reference image is used to indicate at least one of a resolution of the reconstructed image of the reference image and a bitstream bit rate of the reconstructed image of the reference image, to obtain, from the reconstructed-image set based on the quality layer information of the reference image, a reconstructed image matched with the quality layer information of the to-be-decoded image, thereby implementing correct decoding of the to-be-decoded image.

It should be noted herein that, the image in the knowledge-base image set may only be used as a candidate reference image of an image in a to-be-encoded video sequence, to distinguish the image in the knowledge-base image set from the image in the to-be-encoded video sequence.

504: When the reconstructed image having the identification information of the reference image is found, obtain encoded data of the to-be-decoded image from the bitstream data of the to-be-decoded image based on the reconstructed image having the identification information of the reference image, and perform inter-frame decoding on the encoded data of the to-be-decoded image, to obtain a reconstructed image of the to-be-decoded image.

505: When the reconstructed image having the identification information of the reference image is not found, obtain, based on the identification information of the reference image, bitstream data having the identification information of the reference image as bitstream data of the reference image, where the bitstream data of the reference image does not belong to bitstream data of the to-be-decoded video sequence, to exclude the bitstream data having the identification information of the reference image from the bitstream data of the to-be-decoded video sequence, the bitstream data of the reference image includes encoded data of the reference image and the identification information of the reference image, and the identification information of the reference image is carried in a NAL unit header of a NALU corresponding to the reference image or is carried in a slice header of a NALU corresponding to the reference image.

506: Perform decoding based on the encoded data of the reference image to obtain a reconstructed image of the reference image, where the reconstructed image of the reference image has the identification information of the reference image, different reference images have different identification information, and therefore, the reconstructed image of the reference image may be distinguished based on the identification information of the reference image.

After the reconstructed image of the reference image is obtained through parsing, the reconstructed-image set may further be updated by using the reconstructed image of the reference image as a new reconstructed image in the reconstructed-image set. In this embodiment of this disclosure, updating the reconstructed-image set means adding a new reconstructed image to the reconstructed-image set, to increase a quantity of reconstructed images in the reconstructed-image set. In this way, during decoding of another to-be-decoded image in the to-be-decoded video sequence, a possibility of a matched reconstructed image can be improved, thereby improving efficiency of image decoding.

507: Perform inter-frame decoding on encoded data of the to-be-decoded image based on the reconstructed image of the reference image to obtain a reconstructed image of the to-be-decoded image, so that when the reconstructed image having the identification information of the reference image is not found, the reconstructed image of the reference image can still be found by decoding the encoded data in the bitstream data of the reference image, thereby implementing decoding of the to-be-decoded image.

508: When nal_unit_type indicates that the image is a reference image, obtain encoded data of the reference image from the bitstream data of the reference image.

509: Perform decoding based on the encoded data of the reference image to obtain a reconstructed image of the reference image, where the reconstructed image of the reference image has identification information of the reference image, different reference images have different identification information, and therefore, the reconstructed image of the reference image may be distinguished based on the identification information of the reference image.

510: Update a reconstructed-image set by using the reconstructed image of the reference image as a new reconstructed image in the reconstructed-image set, where in this embodiment of this disclosure, updating the reconstructed-image set means adding a new reconstructed image to the reconstructed-image set, to increase a quantity of reconstructed images in the reconstructed-image set, in this way, during decoding of another to-be-decoded image in the to-be-decoded video sequence, a possibility of a matched reconstructed image can be improved, thereby improving efficiency of image decoding.

511: When nal_unit_type indicates that the image is a random access image in a random access segment shown in FIG. 1 and another image in the random access segment in which the random access image is located is used as a reference image of the random access image, decode the image in a conventional intra-frame-prediction-based decoding manner.

512: When nal_unit_type indicates that the image is a non-random access image in a random access segment shown in FIG. 1 and another image in the random access segment in which the non-random access image is located is used as a reference image of the non-random access image, decode the image in a conventional inter-frame-prediction-based decoding manner.

It can be learned based on the foregoing technical solution that, when the received bitstream data belongs to the to-be-decoded image in the to-be-decoded video sequence and the to-be-decoded image is any one of the first image, the second image, and the third image in the decoding order in the random access segment in which the to-be-decoded image is located, the reconstructed image having the identification information of the bitstream data may be found in the reconstructed-image set based on the identification information of the reference image in the bitstream data, and the inter-frame decoding is performed on the encoded data of the to-be-decoded image in the bitstream data based on the reconstructed image having the identification information of the reference image. In other words, for the first image, the second image, and the third image in the decoding order in the random access segment, the reference image used for decoding may be obtained from the reconstructed-image set outside the random access segment, to increase a quantity of reference images that can be referred to for the to-be-decoded image, to be specific, to extend a range of candidate reference images of the to-be-decoded image to some extent, to help improve efficiency of image decoding to some extent. In addition, a reconstructed image of a unique reference image corresponding to the identification information may be found based on the identification information of the reference image, thereby implementing correct image decoding.

Figure 6A:
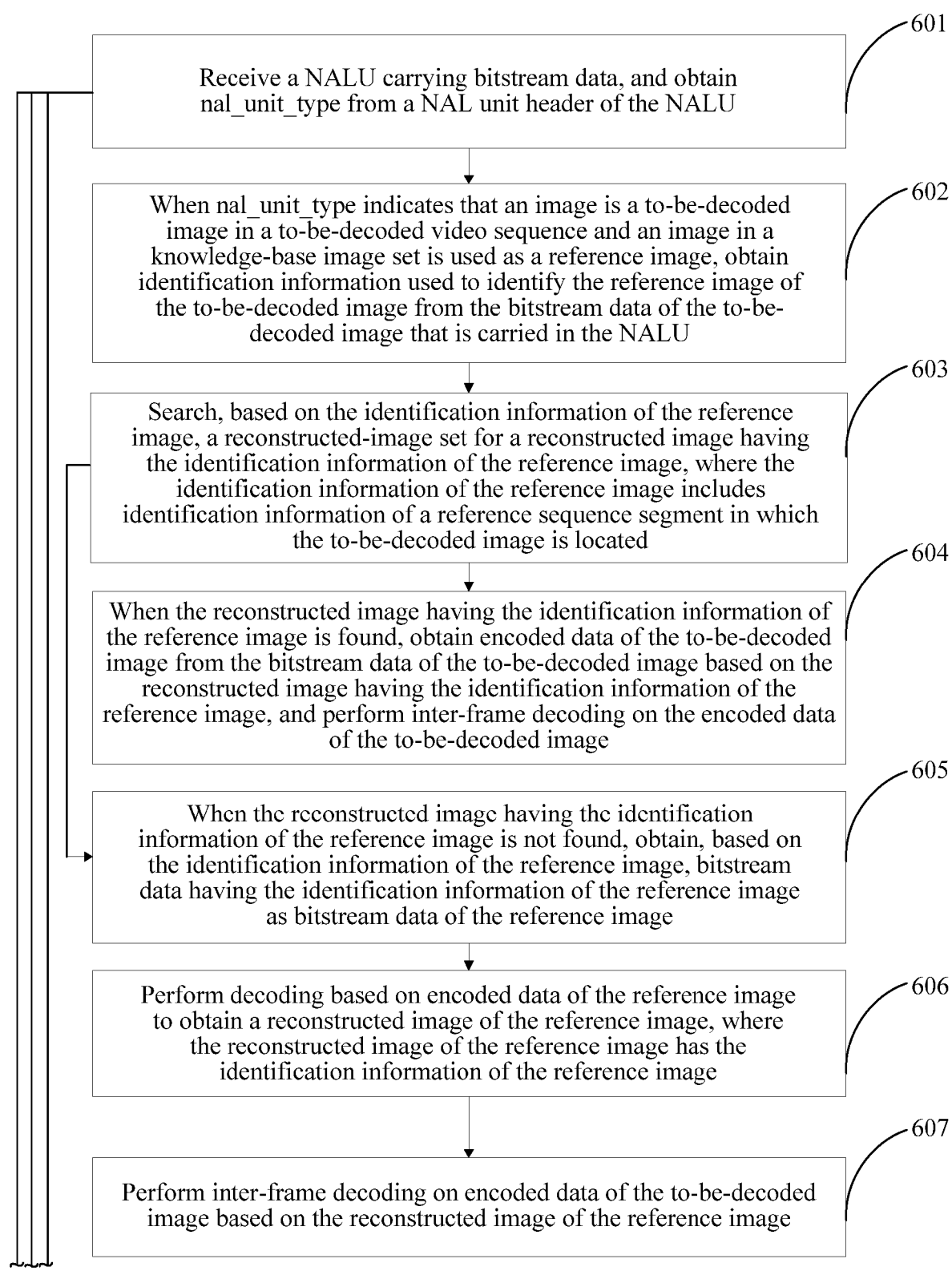
FIG. 6A and FIG. 6B are another flowchart of an image decoding method according to an embodiment of this disclosure.
Figure 6B:
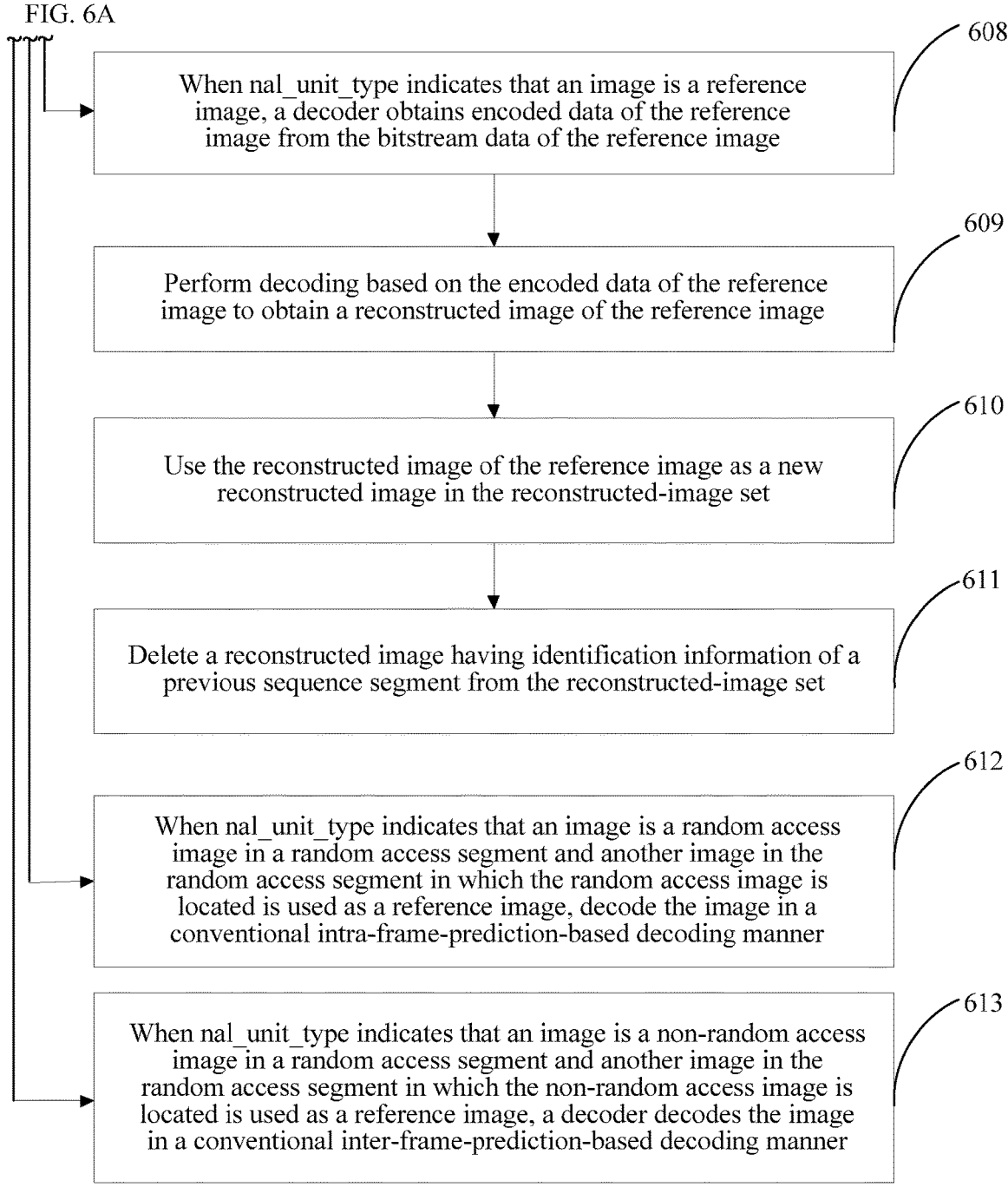

FIG. 6A and FIG. 6B are another flowchart of an image decoding method according to an embodiment of this disclosure. The decoding method shown in FIG. 6A and FIG. 6B is obtained based on the decoding method shown in FIG. 5A and FIG. 5B through modification, and a difference from that in FIG. 5A and FIG. 5B is as follows:

In this embodiment of this disclosure, the to-be-decoded video sequence may include at least two sequence segments, and any one of the at least two sequence segments is used as a reference sequence segment. It is noted in block 603 that the identification information of the reference image includes identification information of a reference sequence segment in which the to-be-decoded image is located, and the identification information of the reference sequence segment is used to indicate that the reference image is used as a candidate reference image of an image in the reference sequence segment. The reference sequence segment includes the random access segment in which the to-be-decoded image is located. In this way, during search of the reconstructed image, the reconstructed image is searched for based on sequence number information of the reference image in the knowledge-base image set and the identification information of the reference sequence segment in which the to-be-decoded image is located.

The identification information of the reference image includes the identification information of the reference sequence segment in which the to-be-decoded image is located because each sequence segment of the to-be-decoded video sequence corresponds to one knowledge-base image set and different images in different knowledge-base image sets may have same identification information. For example, sequence number information of the images in different knowledge-base image sets starts from 0. After bitstream data of these images is summarized, a plurality of images correspond to same sequence number information, resulting in decoding disorder. Therefore, to resolve the problem and correctly distinguish between reference images, the identification information of the reference image should include the identification information of the reference sequence segment in which the to-be-decoded image is located.

When the to-be-decoded video sequence includes the at least two sequence segments, a playing order of the to-be-decoded video sequence may be sequential playing. Correspondingly, the image decoding method provided in this embodiment of this disclosure further includes block 611: Delete a reconstructed image having identification information of a previous sequence segment from the reconstructed-image set, to update the reconstructed-image set and save storage space. The previous sequence segment is a sequence segment previous to the reference sequence segment in the playing order.

Using an example in which the identification information of the reference sequence segment in which the to-be-decoded image is located is a segment sequence number of the reference sequence segment and segment sequence numbers are set in ascending order based on the playing order, each time bitstream data of a reference image is received, encoded data in the bitstream data of the reference image is decoded to obtain a reconstructed image of the reference image, and the reconstructed image of the reference image is used as a new reconstructed image in the reconstructed-image set. Therefore, in an application scenario of the sequential playing, a segment sequence number of a reference sequence segment that is possessed by the new reconstructed image in the reconstructed-image set is greater than segment sequence numbers of reference sequence segments that are possessed by some existing reconstructed images in the reconstructed-image set. A to-be-decoded image that is received again is not decoded with reference to the some existing reconstructed images. Therefore, the some existing reconstructed images may be deleted to save the storage space.

Figure 7:
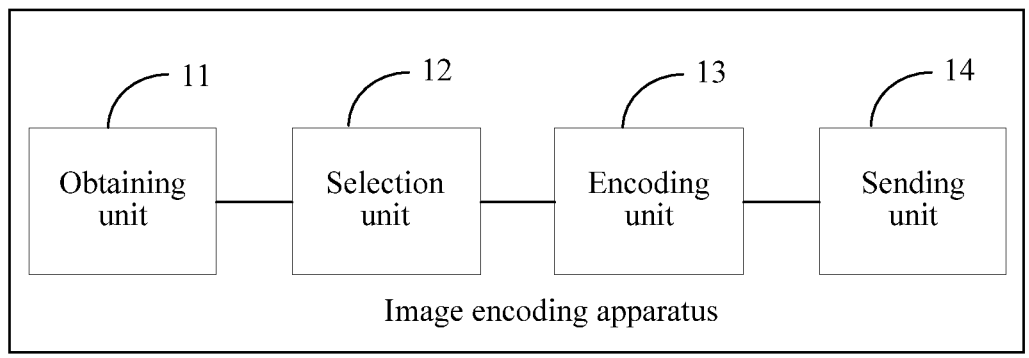
FIG. 7 is a schematic structural diagram of an image encoding apparatus according to an embodiment of this disclosure.

An embodiment of this disclosure provides an image encoding apparatus shown in FIG. 7. The image encoding apparatus may include an obtaining unit 11, a selection unit 12, an encoding unit 13, and a sending unit 14. The units may be implemented by using a software program or a hardware program, or may be implemented by using a circuit.

The obtaining unit 11 is configured to obtain a to-be-encoded image in a to-be-encoded video sequence and at least one knowledge-base image in a knowledge-base image set. The to-be-encoded image may be any one of the first image, the second image, and the third image in a decoding order in a random access segment shown in FIG. 1.

The selection unit 12 is configured to select a reference image of the to-be-encoded image from the at least one knowledge-base image. An image in the knowledge-base image set is used as a candidate reference image of an image in the to-be-encoded video sequence.

The encoding unit 13 is configured to perform inter-frame encoding on the to-be-encoded image based on the reference image to obtain bitstream data of the to-be-encoded image. The bitstream data of the to-be-encoded image includes encoded data of the to-be-encoded image, identification information used to identify the reference image, and an image type of the to-be-encoded image. The image type of the to-be-encoded image is used to indicate that the encoded data of the to-be-encoded image is obtained through inter-frame encoding based on an image in the knowledge-base image set and indicate a quantity of reference images.

The sending unit 14 is configured to send bitstream data of the reference image and the bitstream data of the to-be-encoded image to a decoder side. The bitstream data of the reference image is obtained by the encoding unit 13 by encoding the reference image. The bitstream data of the reference image does not belong to bitstream data of the to-be-encoded video sequence, and the bitstream data of the reference image includes encoded data of the reference image, an image type of the reference image, and the identification information of the reference image. The image type of the reference image is used to indicate that the reference image is an image in the knowledge-base image set.

The bitstream data of the reference image is carried in a NALU corresponding to the reference image. The NALU corresponding to the reference image carries the image type of the reference image and the identification information of the reference image in the bitstream data of the reference image in the following two manners. In one embodiment, the image type of the reference image and the identification information of the reference image are carried in a NAL unit header of the NALU corresponding to the reference image. In other embodiments, the image type of the reference image is carried in a NAL unit header of the NALU corresponding to the reference image, and the identification information of the reference image is carried in a slice header, or referred to as a slice segment header, of the NALU corresponding to the reference image.

The bitstream data of the to-be-encoded image is carried in a NALU corresponding to the to-be-encoded image. The NALU corresponding to the to-be-encoded image carries the image type of the to-be-encoded image and the identification information of the reference image in the bitstream data of the to-be-encoded image in the following two manners. In one embodiment, the image type of the to-be-encoded image and the identification information of the reference image are carried in a NAL unit header of the NALU corresponding to the to-be-encoded image. In other embodiments, the image type of the to-be-encoded image is carried in a NAL unit header of the NALU corresponding to the to-be-encoded image, and the identification information of the reference image is carried in a slice header, or referred to as a slice segment header, of the NALU corresponding to the to-be-encoded image.

In this embodiment of this disclosure, different images in the knowledge-base image set have different identification information. For example, in an embodiment, the identification information of the reference image includes sequence number information of the reference image in the knowledge-base image set.

In another embodiment, the to-be-encoded video sequence includes at least two sequence segments, the identification information of the reference image further includes identification information of a reference sequence segment in which the to-be-encoded image is located, the identification information of the reference sequence segment is used to indicate that the reference image is used as a candidate reference image of an image in the reference sequence segment, the reference sequence segment includes a random access segment in which the to-be-encoded image is located, and the reference sequence segment is any one of the at least two sequence segments.

In still another embodiment, that the encoding unit 14 performs inter-frame encoding on the to-be-encoded image based on the reference image includes: the encoding unit obtains a reconstructed image of the reference image based on the reference image, and performs inter-frame encoding on the to-be-encoded image based on the reconstructed image of the reference image.

Correspondingly, the identification information of the reference image further includes quality layer information of the reference image, and the quality layer information of the reference image is used to indicate at least one of a resolution of the reconstructed image of the reference image and a bitstream bit rate of the reconstructed image of the reference image.

It can be learned from the foregoing technical solution that, for the to-be-encoded image in the to-be-encoded video sequence, the reference image may be selected from the at least one knowledge-base image in the knowledge-base image set. Compared with that a reference image of a to-be-encoded image can only be selected from a random access segment in which the to-be-encoded image is located, a quantity of reference images that can be referred to for the to-be-encoded image is increased, to be specific, a range of candidate reference images of the to-be-encoded image is extended to some extent, to help improve efficiency of image encoding to some extent. In addition, the bitstream data of the to-be-encoded image includes the identification information used to identify the reference image of the to-be-encoded image. In this way, even if the reference image is encoded as an all-intra (All Intra)-mode-coding-based or inter-frame-coding-based random access image, the decoder side can find, based on the identification information of the reference image, a reconstructed image of a unique reference image corresponding to the identification information after receiving the bitstream data, thereby implementing correct image decoding.

Figure 8:
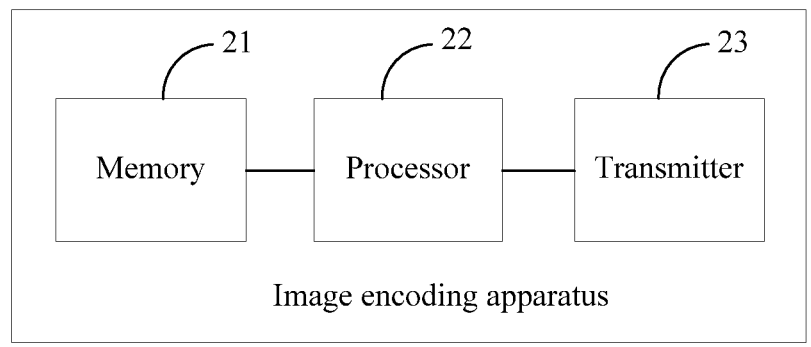
FIG. 8 is another schematic structural diagram of an image encoding apparatus according to an embodiment of this disclosure.

An embodiment of this disclosure provides an image encoding apparatus shown in FIG. 8. The image encoding apparatus may include a memory 21, a processor 22, and a transmitter 23.

The processor 22 is configured to: obtain a to-be-encoded image of a to-be-encoded video sequence and at least one knowledge-base image in a knowledge-base image set, select a reference image of the to-be-encoded image from the at least one knowledge-base image, and perform inter-frame encoding on the to-be-encoded image based on the reference image, to obtain bitstream data of the to-be-encoded image. The to-be-encoded image of the to-be-encoded video sequence and the at least one knowledge-base image in the knowledge-base image set may be stored in the memory 21, and an image in the knowledge-base image set is used as a candidate reference image of an image in the to-be-encoded video sequence. The bitstream data of the to-be-encoded image includes encoded data of the to-be-encoded image, identification information used to identify the reference image, and an image type of the to-be-encoded image. The image type of the to-be-encoded image is used to indicate that the encoded data of the to-be-encoded image is obtained through inter-frame encoding based on an image in the knowledge-base image set and indicate a quantity of reference images.

The to-be-encoded image may be any one of the first image, the second image, and the third image in a decoding order in a random access segment shown in FIG. 1.

The memory 21 may further be configured to store code, so that the code is read by the processor 22 to perform the image encoding method provided in the embodiments of this disclosure.

The transmitter 23 is configured to send bitstream data of the reference image and the bitstream data of the to-be-encoded image to a decoder side. The bitstream data of the reference image is obtained by the processor 22 by encoding the reference image. The bitstream data of the reference image does not belong to bitstream data of the to-be-encoded video sequence, and the bitstream data of the reference image includes encoded data of the reference image, an image type of the reference image, and the identification information of the reference image. The image type of the reference image is used to indicate that the reference image is an image in the knowledge-base image set.

The bitstream data of the reference image is carried in a NALU corresponding to the reference image. The NALU corresponding to the reference image carries the image type of the reference image and the identification information of the reference image in the bitstream data of the reference image in the following two manners. In one embodiment, the image type of the reference image and the identification information of the reference image are carried in a NAL unit header of the NALU corresponding to the reference image. In other embodiments, the image type of the reference image is carried in a NAL unit header of the NALU corresponding to the reference image, and the identification information of the reference image is carried in a slice header or a slice segment header of the NALU corresponding to the reference image.

The bitstream data of the to-be-encoded image is carried in a NALU corresponding to the to-be-encoded image. The NALU corresponding to the to-be-encoded image carries the image type of the to-be-encoded image and the identification information of the reference image in the bitstream data of the to-be-encoded image in the following two manners. In one embodiment, the image type of the to-be-encoded image and the identification information of the reference image are carried in a NAL unit header of the NALU corresponding to the to-be-encoded image. In other embodiments, the image type of the to-be-encoded image is carried in a NAL unit header of the NALU corresponding to the to-be-encoded image, and the identification information of the reference image is carried in a slice header or a slice segment header of the NALU corresponding to the to-be-encoded image.

In this embodiment of this disclosure, different images in the knowledge-base image set have different identification information. For example, in an embodiment, the identification information of the reference image includes sequence number information of the reference image in the knowledge-base image set.

In another embodiment, the to-be-encoded video sequence includes at least two sequence segments, the identification information of the reference image further includes identification information of a reference sequence segment in which the to-be-encoded image is located, the identification information of the reference sequence segment is used to indicate that the reference image is used as a candidate reference image of an image in the reference sequence segment, the reference sequence segment includes a random access segment in which the to-be-encoded image is located, and the reference sequence segment is any one of the at least two sequence segments.

In still another embodiment, that the processor 22 performs inter-frame encoding on the to-be-encoded image based on the reference image includes: the encoding unit obtains a reconstructed image of the reference image based on the reference image, and performs inter-frame encoding on the to-be-encoded image based on the reconstructed image of the reference image.

Correspondingly, the identification information of the reference image further includes quality layer information of the reference image, and the quality layer information of the reference image is used to indicate at least one of a resolution of the reconstructed image of the reference image and a bitstream bit rate of the reconstructed image of the reference image.

It can be learned from the foregoing technical solution that, for the to-be-encoded image in the to-be-encoded video sequence, the reference image may be selected from the at least one knowledge-base image in the knowledge-base image set. Compared with that a reference image of a to-be-encoded image can only be selected from a random access segment in which the to-be-encoded image is located, a quantity of reference images that can be referred to for the to-be-encoded image is increased, to be specific, a range of candidate reference images of the to-be-encoded image is extended to some extent, to help improve efficiency of image encoding to some extent. In addition, the bitstream data of the to-be-encoded image includes the identification information used to identify the reference image of the to-be-encoded image. In this way, even if the reference image is encoded as an all-intra (All Intra)-mode-coding-based or inter-frame-coding-based random access image, the decoder side can find, based on the identification information of the reference image, a reconstructed image of a unique reference image corresponding to the identification information after receiving the bitstream data, thereby implementing correct image decoding.

In addition, an embodiment of this disclosure further provides a storage medium. The storage medium records program code configured to perform the image encoding method provided in the embodiments of this disclosure.

Figure 9:
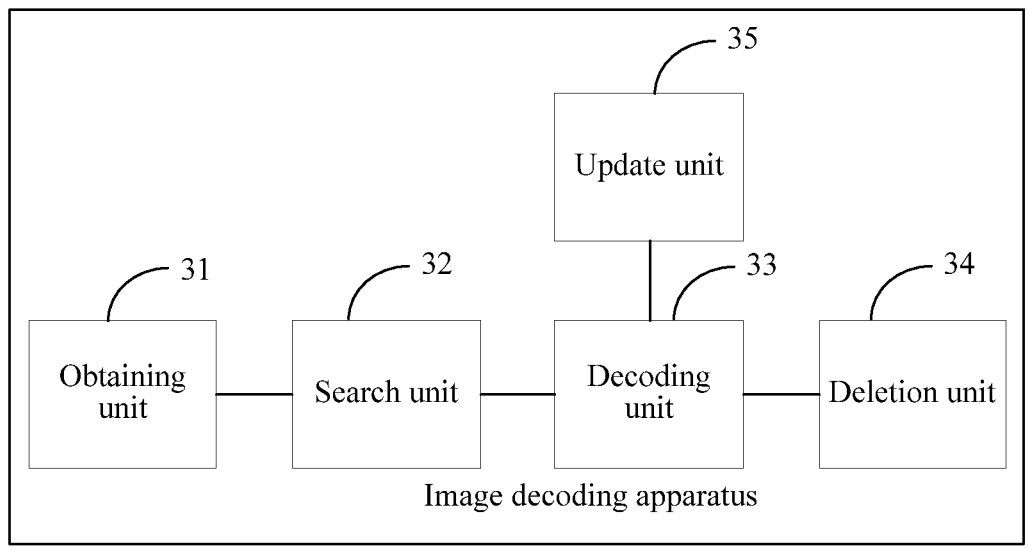
FIG. 9 is a schematic structural diagram of an image decoding apparatus according to an embodiment of this disclosure.

An embodiment of this disclosure provides an image decoding apparatus shown in FIG. 9. The image decoding apparatus may include an obtaining unit 31, a search unit 32, and a decoding unit 33. The units may be implemented by using a software program or a hardware program, or may be implemented by using a circuit.

The obtaining unit 31 is configured to obtain bitstream data of a to-be-decoded image. The bitstream data of the to-be-decoded image includes encoded data of the to-be-decoded image, identification information used to identify a reference image of the to-be-decoded image, and an image type of the to-be-decoded image. The image type of the to-be-decoded image is used to indicate that the encoded data of the to-be-decoded image is obtained through inter-frame encoding based on an image in a knowledge-base image set.

The to-be-decoded image may be any one of the first image, the second image, and the third image in a decoding order in a random access segment shown in FIG. 1.

In one embodiment, the image type of the to-be-decoded image is further used to indicate a quantity of reference images. When the image type of the to-be-decoded image indicates that the quantity of reference images is at least two, there are at least two pieces of identification information of the reference images, and the reference images are in a one-to-one correspondence with the identification information of the reference images.

The image type of the to-be-decoded image and identification information of the to-be-decoded image are carried in a NAL unit header of a NALU corresponding to the to-be-decoded image. Alternatively, the image type of the to-be-decoded image is carried in a NAL unit header of a NALU corresponding to the to-be-decoded image, and identification information of the to-be-decoded image is carried in a slice header or a slice segment header of the NALU corresponding to the to-be-decoded image.

The search unit 32 is configured to search, based on the identification information of the reference image, a reconstructed-image set for a reconstructed image having the identification information of the reference image. The reconstructed image is a knowledge-base reconstructed image obtained through reconstruction, that is, the reconstructed-image set includes the knowledge-base reconstructed image obtained through reconstruction. The knowledge-base reconstructed image is a reconstructed image of the image in the knowledge-base image set, and the image in the knowledge-base image set is used as a candidate reference image of an image in a to-be-decoded video sequence in which the to-be-decoded image is located.

Different reconstructed images in the reconstructed-image set have different identification information, to distinguish between the reconstructed images. In this way, a unique reconstructed image corresponding to the identification information may be found based on the identification information of the reference image.

The decoding unit 33 is configured to: when the reconstructed image having the identification information of the reference image is found, perform inter-frame decoding on the encoded data of the to-be-decoded image based on the reconstructed image having the identification information of the reference image, to obtain a reconstructed image of the to-be-decoded image.

It can be learned from the foregoing technical solution that, after the bitstream data of the to-be-decoded image is obtained, the reconstructed image having the identification information of the reference image is found in the reconstructed-image set based on the identification information of the reference image in the bitstream data, and the inter-frame decoding is performed on the encoded data of the to-be-decoded image in the bitstream data based on the reconstructed image having the identification information of the reference image. To be specific, for the to-be-decoded image, the reference image used for decoding may be obtained from the reconstructed-image set outside the random access segment, to increase a quantity of reference images that can be referred to for the to-be-decoded image, to be specific, to extend a range of candidate reference images of the to-be-decoded image to some extent, to help improve efficiency of image decoding to some extent. In addition, a reconstructed image of a unique reference image corresponding to the identification information may be found based on the identification information of the reference image, thereby implementing correct image decoding.

In one embodiment, the obtaining unit 31 is further configured to: when the search unit does not find the reconstructed image having the identification information of the reference image, obtain, based on the identification information of the reference image, bitstream data having the identification information of the reference image as bitstream data of the reference image. The bitstream data of the reference image does not belong to bitstream data of the to-be-decoded video sequence. The bitstream data of the reference image includes encoded data of the reference image, the identification information of the reference image, and an image type of the reference image. The image type of the reference image is used to indicate that the reference image is an image in the knowledge-base image set.

The bitstream data of the reference image is carried in a NALU corresponding to the reference image. The NALU corresponding to the reference image carries the image type of the reference image and the identification information of the reference image in the bitstream data of the reference image in the following two manners. In one embodiment, the image type of the reference image and the identification information of the reference image are carried in a NAL unit header of the NALU corresponding to the reference image. In other embodiments, the image type of the reference image is carried in a NAL unit header of the NALU corresponding to the reference image, and the identification information of the reference image is carried in a slice header or a slice segment header of the NALU corresponding to the reference image.

For the identification information of the reference image, in one embodiment, the identification information of the reference image includes sequence number information of the reference image in the knowledge-base image set.

In another embodiment, the to-be-decoded video sequence includes at least two sequence segments, the identification information of the reference image further includes identification information of a reference sequence segment in which the to-be-decoded image is located, the identification information of the reference sequence segment is used to indicate that the reference image is used as a candidate reference image of an image in the reference sequence segment, the reference sequence segment includes a random access segment in which the to-be-decoded image is located, and the reference sequence segment is any one of the at least two sequence segments. Correspondingly, the image decoding apparatus shown in FIG. 9 further includes a deletion unit 34, configured to: when a playing order of the to-be-decoded video sequence is sequential playing, delete a reconstructed image having identification information of a previous sequence segment from the reconstructed-image set to update the reconstructed-image set. The previous sequence segment is a sequence segment previous to the reference sequence segment in the playing order.

In still another embodiment, the identification information of the reference image further includes quality layer information of the reference image, and the quality layer information of the reference image is used to indicate at least one of a resolution of the reconstructed image of the reference image and a bitstream bit rate of the reconstructed image of the reference image.

The decoding unit 33 is further configured to perform decoding based on the encoded data of the reference image to obtain a reconstructed image of the reference image. The reconstructed image of the reference image has the identification information of the reference image.

The decoding unit 33 is further configured to perform inter-frame decoding on the encoded data of the to-be-decoded image based on the reconstructed image of the reference image to obtain a reconstructed image of the to-be-decoded image, so that when the reconstructed image having the identification information of the reference image is not found, the reconstructed image of the reference image can still be found by decoding the encoded data in the bitstream data of the reference image, thereby implementing decoding of the to-be-decoded image.

Correspondingly, the image decoding apparatus shown in FIG. 9 further includes an update unit 35, configured to update the reconstructed-image set by using the reconstructed image of the reference image as a new reconstructed image in the reconstructed-image set. In this embodiment of this disclosure, updating the reconstructed-image set means adding a new reconstructed image to the reconstructed-image set, to increase a quantity of reconstructed images in the reconstructed-image set. In this way, during decoding of another to-be-decoded image in the to-be-decoded video sequence, a possibility of a matched reconstructed image can be improved, thereby improving efficiency of image decoding.

Figure 10:
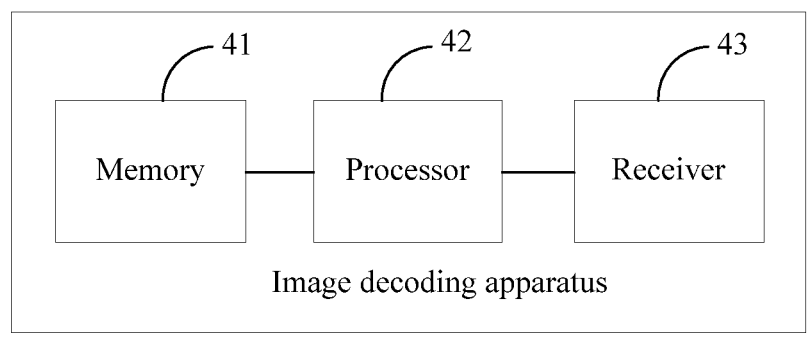
FIG. 10 is a schematic structural diagram of an image decoding apparatus according to an embodiment of this disclosure.

An embodiment of this disclosure provides an image decoding apparatus shown in FIG. 10. The image decoding apparatus may include a memory 41, a processor 42, and a receiver 43.

The processor 42 is configured to: obtain bitstream data of a to-be-decoded image by using the receiver 43, search, based on identification information of a reference image, a reconstructed-image set for a reconstructed image having the identification information of the reference image, and when the reconstructed image having the identification information of the reference image is found, perform inter-frame decoding on encoded data of the to-be-decoded image based on the reconstructed image having the identification information of the reference image, to obtain a reconstructed image of the to-be-decoded image.

The reconstructed image in the reconstructed-image set and the reconstructed image of the to-be-decoded image are stored in the memory 41. The reconstructed image is a knowledge-base reconstructed image obtained through reconstruction, that is, the reconstructed-image set includes a knowledge-base image obtained through reconstruction. Different reconstructed images in the reconstructed-image set have different identification information, to distinguish between the reconstructed images. In this way, a unique reconstructed image corresponding to the identification information may be found based on the identification information of the reference image. The knowledge-base reconstructed image is a reconstructed image of an image in a knowledge-base image set, and the image in the knowledge-base image set is used as a candidate reference image of an image in a to-be-decoded video sequence in which the to-be-decoded image is located.

The to-be-decoded image may be any one of the first image, the second image, and the third image in a decoding order in a random access segment shown in FIG. 1.

In one embodiment, the memory 41 is further configured to store code, so that the code is read by the processor 42 to perform the image decoding method provided in the embodiments of this disclosure.

The bitstream data of the to-be-decoded image includes the encoded data of the to-be-decoded image, the identification information used to identify the reference image of the to-be-decoded image, and an image type of the to-be-decoded image. The image type of the to-be-decoded image is used to indicate that the encoded data of the to-be-decoded image is obtained through inter-frame encoding based on an image in the knowledge-base image set.

In one embodiment, the image type of the to-be-decoded image is further used to indicate a quantity of reference images. When the image type of the to-be-decoded image indicates that the quantity of reference images is at least two, there are at least two pieces of identification information of the reference images, and the reference images are in a one-to-one correspondence with the identification information of the reference images.

The image type of the to-be-decoded image and identification information of the to-be-decoded image are carried in a NAL unit header of a NALU corresponding to the to-be-decoded image. Alternatively, the image type of the to-be-decoded image is carried in a NAL unit header of a NALU corresponding to the to-be-decoded image, and identification information of the to-be-decoded image is carried in a slice header or a slice segment header of the NALU corresponding to the to-be-decoded image.

It can be learned from the foregoing technical solution that, after the bitstream data of the to-be-decoded image is obtained, the reconstructed image having the identification information of the reference image is found in the reconstructed-image set based on the identification information of the reference image in the bitstream data, and the inter-frame decoding is performed on the encoded data of the to-be-decoded image in the bitstream data based on the reconstructed image having the identification information of the reference image. To be specific, for the to-be-decoded image, the reference image used for decoding may be obtained from the reconstructed-image set outside the random access segment, to increase a quantity of reference images that can be referred to for the to-be-decoded image, to be specific, to extend a range of candidate reference images of the to-be-decoded image to some extent, to help improve efficiency of image decoding to some extent. In addition, a reconstructed image of a unique reference image corresponding to the identification information may be found based on the identification information of the reference image, thereby implementing correct image decoding.

In one embodiment, the processor 42 is further configured to: when the search unit does not find the reconstructed image having the identification information of the reference image, obtain, by using the receiver 43 based on the identification information of the reference image, bitstream data having the identification information of the reference image as bitstream data of the reference image. The bitstream data of the reference image does not belong to bitstream data of the to-be-decoded video sequence. The bitstream data of the reference image includes encoded data of the reference image, the identification information of the reference image, and an image type of the reference image. The image type of the reference image is used to indicate that the reference image is an image in the knowledge-base image set.

The bitstream data of the reference image is carried in a NALU corresponding to the reference image. The NALU corresponding to the reference image carries the image type of the reference image and the identification information of the reference image in the bitstream data of the reference image in the following two manners. In one embodiment, the image type of the reference image and the identification information of the reference image are carried in a NAL unit header of the NALU corresponding to the reference image. In other embodiments, the image type of the reference image is carried in a NAL unit header of the NALU corresponding to the reference image, and the identification information of the reference image is carried in a slice header or a slice segment header of the NALU corresponding to the reference image.

For the identification information of the reference image, in one embodiment, the identification information of the reference image includes sequence number information of the reference image in the knowledge-base image set.

In another embodiment, the to-be-decoded video sequence includes at least two sequence segments, the identification information of the reference image further includes identification information of a reference sequence segment in which the to-be-decoded image is located, the identification information of the reference sequence segment is used to indicate that the reference image is used as a candidate reference image of an image in the reference sequence segment, the reference sequence segment includes a random access segment in which the to-be-decoded image is located, and the reference sequence segment is any one of the at least two sequence segments. The processor 42 may be further configured to: when a playing order of the to-be-decoded video sequence is sequential playing, delete a reconstructed image having identification information of a previous sequence segment from the reconstructed-image set to update the reconstructed-image set. The previous sequence segment is a sequence segment previous to the reference sequence segment in the playing order.

In still another embodiment, the identification information of the reference image further includes quality layer information of the reference image, and the quality layer information of the reference image is used to indicate at least one of a resolution of the reconstructed image of the reference image and a bitstream bit rate of the reconstructed image of the reference image.

The processor 42 is further configured to perform decoding based on the encoded data of the reference image to obtain a reconstructed image of the reference image, and perform inter-frame decoding on the encoded data of the to-be-decoded image based on the reconstructed image of the reference image, to obtain a reconstructed image of the to-be-decoded image, so that when the reconstructed image having the identification information of the reference image is not found, the reconstructed image of the reference image can still be obtained by decoding the encoded data in the bitstream data of the reference image, thereby implementing decoding of the to-be-decoded image.

The reconstructed image of the reference image has the identification information of the reference image. The processor 42 is further configured to update the reconstructed-image set by using the reconstructed image of the reference image as a new reconstructed image in the reconstructed-image set. In this embodiment of this disclosure, updating the reconstructed-image set means adding a new reconstructed image to the reconstructed-image set, to increase a quantity of reconstructed images in the reconstructed-image set. In this way, during decoding of another to-be-decoded image in the to-be-decoded video sequence, a possibility of a matched reconstructed image can be improved, thereby improving efficiency of image decoding.

In addition, an embodiment of this disclosure further provides a storage medium. The storage medium records program code configured to perform the image decoding method provided in the embodiments of this disclosure.

The embodiments in this specification are all described in a progressive manner, for same or similar parts in the embodiments, refer to these embodiments, and each embodiment focuses on a difference from other embodiments.

The embodiments disclosed above are described to enable a person skilled in the art to implement or use the present disclosure. Various modifications to the embodiments are obvious to a person skilled in the art, and general principles defined in this specification may be implemented in other embodiments without departing from the scope of the present disclosure. Therefore, this disclosure is not intended to be limited to these embodiments illustrated in this specification, but shall be construed in the widest scope consistent with the principles and novel features disclosed in this specification.

What is claimed is:

1. An image decoding method, comprising:
    obtaining bitstream data of a to-be-decoded image, wherein the bitstream data of the to-be-decoded image comprises encoded data of the to-be-decoded image and identification information used to identify a reference image of the to-be-decoded image and wherein the to-be-decoded image is part of a video sequence;
    searching, based on the identification information, a reconstructed-image set for a reconstructed image having the identification information of the reference image, wherein the reconstructed image is a knowledge-base reconstructed image obtained through reconstruction, the knowledge-base reconstructed image is a reconstructed image of an image in a knowledge-base image set, and the image in the knowledge-base image set is used as a candidate reference image of an image in a to-be-decoded video sequence in which the to-be-decoded image is located, wherein a first random access segment of the video sequence comprises the reference image and a second random access segment of the video sequence comprises the to-be-decoded image;
    in response to determining that the reconstructed image having the identification information of the reference image is found, performing inter-frame decoding on the encoded data of the to-be-decoded image based on the reconstructed image having the identification information of the reference image, to obtain a reconstructed image of the to-be-decoded image;

in response to determining that the reconstructed image having the identification information of the reference image is not found, obtaining, based on the identification information of the reference image, bitstream data having the identification information of the reference image as bitstream data of the reference image, wherein the bitstream data of the reference image does not belong to bitstream data of the to-be-decoded video sequence, and the bitstream data of the reference image comprises encoded data of the reference image and the identification information of the reference image;

performing decoding based on the encoded data of the reference image to obtain a reconstructed image of the reference image, wherein the reconstructed image of the reference image has the identification information of the reference image; and performing inter-frame decoding on the encoded data of the to-be-decoded image based on the reconstructed image of the reference image to obtain a reconstructed image of the to-be-decoded image.

2. The method according to claim 1, wherein the method further comprises:

updating the reconstructed-image set by using the reconstructed image of the reference image as a new reconstructed image in the reconstructed-image set.

3. The method according to claim 1, wherein the bitstream data of the reference image comprises an image type of the reference image, and the image type of the reference image is used to indicate that the reference image is an image in the knowledge-base image set.

4. The method according to claim 3, wherein the image type of the reference image and the identification information of the reference image are in a network abstraction layer unit header of a network abstraction layer unit corresponding to the reference image; or the image type of the reference image is in a network abstraction layer unit header of a network abstraction layer unit corresponding to the reference image, and the identification information of the reference image is carried in a network abstraction layer slice header of the network abstraction layer unit corresponding to the reference image.

5. An image decoding apparatus, comprising:

an obtaining circuit, configured to obtain bitstream data of a to-be-decoded image, wherein the bitstream data of the to-be-decoded image comprises encoded data of the to-be- decoded image and identification information used to identify a reference image of the to- be-decoded image and wherein the to-be-decoded image is part of a video sequence;

a search circuit, configured to search, based on the identification information of the reference image, a reconstructed-image set for a reconstructed image having the identification information of the reference image, wherein the reconstructed image is a knowledge-base reconstructed image obtained through reconstruction, the knowledge-base reconstructed image is a reconstructed image of an image in a knowledge-base image set, and the image in the knowledge-base image set is used as a candidate reference image of an image in a to-be-decoded video sequence in which the to-be-decoded image is located, wherein a first random access segment of the video sequence comprises the reference image and a second random access segment of the video sequence comprises the to-be-decoded image; and a decoding circuit, configured to:

in response to determining that the reconstructed image having the identification information of the reference image is found, perform inter-frame decoding on the encoded data of the to-be-decoded image based on the reconstructed image having the identification information of the reference image, to obtain a reconstructed image of the to-be-decoded image;

in response to determining that the reconstructed image having the identification information of the reference image is not found, obtain, based on the identification information of the reference image, bitstream data having the identification information of the reference image as bitstream data of the reference image, wherein the bitstream data of the reference image does not belong to bitstream data of the to-be-decoded video sequence, and the bitstream data of the reference image comprises encoded data of the reference image and the identification information of the reference image;

perform decoding based on the encoded data of the reference image to obtain a reconstructed image of the reference image, wherein the reconstructed image of the reference image has the identification information of the reference image; and perform inter-frame decoding on the encoded data of the to-be-decoded image based on the reconstructed image of the reference image to obtain a reconstructed image of the to-be-decoded image.

6. The apparatus according to claim 5, wherein the apparatus further comprises an update circuit, configured to update the reconstructed-image set by using the reconstructed image of the reference image as a new reconstructed image in the reconstructed-image set.

7. The apparatus according to claim 5, wherein the bitstream data of the reference image comprises an image type of the reference image, and the image type of the reference image is used to indicate that the reference image is an image in the knowledge-base image set.

8. The apparatus according to claim 7, wherein the image type of the reference image and the identification information of the reference image are in a network abstraction layer unit header of a network abstraction layer unit corresponding to the reference image; or the image type of the reference image is in a network abstraction layer unit header of a network abstraction layer unit corresponding to the reference image, and the identification information of the reference image is in a network abstraction layer slice header of the network abstraction layer unit corresponding to the reference image.

9. A non-transitory computer-readable storage medium coupled to a processor and storing programming instructions for execution by the processor, the programming instructions instruct the processor to:

obtain bitstream data of a to-be-decoded image, wherein the bitstream data of the to-be- decoded image comprises encoded data of the to-be-decoded image and identification information used to identify a reference image of the to-be-decoded image and wherein the to-be-decoded image is part of a video sequence;

search, based on the identification information, a reconstructed-image set for a reconstructed image having the identification information of the reference image, wherein the reconstructed image is a knowledge-base reconstructed image obtained through reconstruction, the knowledge-base reconstructed image is a reconstructed image of an image in a knowledge-base image set, and the image in the knowledge-base image set is used as a candidate reference image of an image in a to-be-decoded video sequence in which the to-be-decoded image is located, wherein a first random access segment of the video sequence comprises the reference image and a second random access segment of the video sequence comprises the to-be-decoded image;

in response to determining that the reconstructed image having the identification information of the reference image is found, perform inter-frame decoding on the encoded data of the to-be-decoded image based on the reconstructed image having the identification information of the reference image, to obtain a reconstructed image of the to-be-decoded image;

in response to determining that the reconstructed image having the identification information of the reference image is not found, obtain, based on the identification information of the reference image, bitstream data having the identification information of the reference image as bitstream data of the reference image, wherein the bitstream data of the reference image does not belong to bitstream data of the to-be-decoded video sequence, and the bitstream data of the reference image comprises encoded data of the reference image and the identification information of the reference image;

perform decoding based on the encoded data of the reference image to obtain a reconstructed image of the reference image, wherein the reconstructed image of the reference image has the identification information of the reference image; and perform inter-frame decoding on the encoded data of the to-be-decoded image based on the reconstructed image of the reference image to obtain a reconstructed image of the to-be-decoded image.

10. The non-transitory computer-readable storage medium according to claim 9, wherein the programming instructions further instruct the processor to:

update the reconstructed-image set by using the reconstructed image of the reference image as a new reconstructed image in the reconstructed-image set.

11. The non-transitory computer-readable storage medium according to claim 9, wherein the bitstream data of the reference image comprises an image type of the reference image, and the image type of the reference image is used to indicate that the reference image is an image in the knowledge-base image set.

12. The non-transitory computer-readable storage medium according to claim 11, wherein the image type of the reference image and the identification information of the reference image are in a network abstraction layer unit header of a network abstraction layer unit corresponding to the reference image; or the image type of the reference image is in a network abstraction layer unit header of a network abstraction layer unit corresponding to the reference image, and the identification information of the reference image is carried in a network abstraction layer slice header of the network abstraction layer unit corresponding to the reference image.

* * * * *